United States Patent [19]
Vittay

[11] 4,355,276
[45] Oct. 19, 1982

[54] APPARATUS FOR SUPPLYING HIGH POWER ELECTRIC LOADS OPERATED IN A PULSE-LIKE MANNER, ESPECIALLY FOR X-RAY EQUIPMENT

[75] Inventor: Pal Vittay, Budapest, Hungary

[73] Assignee: Medicor Muvek, Budapest, Hungary

[21] Appl. No.: 29,352

[22] Filed: Apr. 11, 1979

[51] Int. Cl.³ .................. H02K 39/00; H02P 9/12
[52] U.S. Cl. ..................................... 322/4; 322/8; 322/28; 310/74
[58] Field of Search ............... 310/74; 322/4, 8, 100, 322/28; 250/460

[56] References Cited
U.S. PATENT DOCUMENTS

| | | | |
|---|---|---|---|
| 1,456,955 | 5/1923 | Wagner | 322/4 X |
| 2,301,424 | 11/1942 | List et al. | 322/4 X |
| 3,193,713 | 7/1965 | Larson et al. | 310/74 X |
| 3,569,791 | 3/1971 | Vogel | 322/8 X |
| 3,758,843 | 9/1973 | Ishizaki et al. | 322/28 X |
| 4,182,967 | 1/1980 | Jordan | 310/74 |
| 4,200,831 | 4/1980 | Weldon et al. | 322/8 |

OTHER PUBLICATIONS
"Kleines Handbuch Technischer Regelvorgänge", pp. 514, 515.

*Primary Examiner*—Robert J. Hickey
*Attorney, Agent, or Firm*—Karl F. Ross

[57] ABSTRACT

The invention relates to an apparatus for supplying high-power electric loads operated in a pulse-like manner, particularly to X-ray equipment.

The apparatus makes use of the mechanical energy of rotation of a flywheel rotated through a time period which is substantially longer than the pulse duration of the load by a driving power being substantially smaller than the pulse power of the load to generate a supply voltage for the load in expense of this mechanical energy. The driving period of the flywheel and the associated moderate driving power provide an energy balance with the short pulses with high power consumption. The apparatus comprises a generator unit with at least one electric rotary machine which has a rotor that rotates together with the flywheel. The excitation of the rotary machine is provided by a field power supply being controlled by a control unit. The control unit controls the excitation of the generator unit to provide predetermined output voltage and current levels for the load.

The apparatus according to the invention can provide a specified operation control for the load.

According to an aspect of the invention a method has been provided for carrying out fluorography which can see to an increased sensed light intensity. According to this method fluoroscopy is carried out by pulsed X-ray irradiation with small average intensity and high pulse intensity, in which the repetition frequency of the pulse is high enough to provide for a continuous light sensation. Such pulsed irradiation provides for an image on the fluoroscopic screen in which the sensed light intensity is increased by the ratio of the peak and average radiation intensities compared to the light intensity of a conventional continuous irradiation with the average intensity.

25 Claims, 27 Drawing Figures

Stator

Rotor

APPARATUS FOR SUPPLYING HIGH POWER ELECTRIC LOADS OPERATED IN A PULSE-LIKE MANNER, ESPECIALLY FOR X-RAY EQUIPMENT

BACKGROUND OF THE INVENTION

The present invention relates to an apparatus for supplying high power electric loads operated in a pluse-like manner, especially for X-ray equipment and optionally for controlling thereof.

In engineering it is frequently encountered that for the normal operation of a high power electric load, short lasting energy is required, in which the long term average power is significantly lower than its peak value corresponding to the operational cycles. In this case, either an intermediate buffer energy store is used with sufficient storage capacity for covering the maximum power consumption, or an electrical network is established with dimensions in accordance with the maximum value of the load.

As an intermediate buffer store usually a battery or a capacitor plant is applied. A typical example for the battery application is the starting of a motor vehicle in which the high power required for the starting is supplied in expense of the energy loaded in previously, during a longer period of time at a lower power level. Capacitors are used as buffers frequently for high power discharge applications and for many other areas.

When such intermediate energy stores are used, operational current and voltage values are provided for the load, or the voltage and power demand of the load are adjusted to meet the existing energy supplying possibilities. This matching operation can be solved in many areas of engineering. There are certain applications, however, where the usual intermediate energy stores are not capable of providing proper voltage and current values required for the normal operation of the load, although their capacity would be sufficient to cover peak power consumption. Typically such application is the X-ray technique that will be discussed in detail for its great significance. However, the special problems discussed in connection with X-ray technique can also be valid in other fields of applications. Therefore, the technical background of the present invention cannot be limited to the X-ray technique since each application with similar problems can be involved.

It is widely known that the generation of X-rays, e.g. for making roentgenograms, requires high power electric energy with short duration. As an example, when utilizing the limit load of advanced X-ray tubes, 100–150 kW power is required for a duration of about 0.1 second. During the exposure this power is provided with precise adjusted voltage and current values. The high voltage of the X-ray tube ranges between 50 and 150 kV.

It is also known that the switching of high voltage circuits is a very difficult operation, due to the hazard of arc forming. It is practically impossible to adjust exposure times of some hundredths or tenths of a second by means of high voltage switches, due to their large size and inertia and because of the increased risk of arc forming. The switching on of high voltage levels can be accomplished by means of high voltage switching tubes, i.e. triodes, tetrodes or grid controlled X-ray tubes. The application of such tubes is limited, however, because of their high costs, the large space they need and the complicated way of their control. Therefore in X-ray technique, the switching of the high voltage transformers is generally carried out at the primary side.

The application of high voltage transformers excludes the use of the conventional intermediate buffer stores, since both the battery and the capacitor provide a direct current voltage being inappropriate for feeding directly the X-ray transformer. Although there exist circuits which generate alternative current with a given frequency from a direct current voltage, their application would give rise to further problems due to the usual power levels and short times of operation required in X-ray technique.

For the sake of completeness, there is known portable X-ray equipment that uses capacitors for storing the electrical energy required for field operation. These capacitors are charged through a longer period from an electric network which has a lower power-supplying ability. Then by means of appropriate change-over switches, the capacitors are interconnected (e.g. parallel-series conversion) to supply the high voltage required for operating the X-ray tube. These arrangements use complicated and expensive switches and have the disadvantage that during the discharging process the voltage of the X-ray tube continuously decreases and the X-ray quality rapidly changes. At such high tensions voltage stabilizator circuits cannot be applied.

On account of these facts, the second of the alternatives referred to above is used in X-ray technique, i.e. the electric network which feeds the X-ray equipment is dimensioned to the maximum power consumption of the equipment.

The internal resistance of a main network designed to feed advanced X-ray equipment should be very low, in the order of 0.1 ohm, so that the voltage drop occurring when the X-ray tube is switched on is tolerable and compensatable. A further difficulty is caused by the voltage fluctuation of the power supply which can have an unfavorable effect on the quality of the roentgenogram if it occurs during the preparation and completion of the exposure.

The efficiency of utilization of such a network dimensioned for power peak values is very poor and its construction is connected with high investment costs. In the majority of hospitals a separate power supply system is provided for feeding the X-ray equipment, so that the load peaks in the normal municipal energy distributing network cannot cause voltage drops in the special network that feeds the X-ray equipment. The establishment of such a separate power supply system requires significant investments, which may hamper the application of X-ray equipment and at the same time the possibilities in X-ray technique are unfavorably influenced by the imperfect supplying network.

The problem of power supply is still more acute in the case of portable X-ray equipment used in hospital wards, in intensive care units and in operating theaters. In such places, the available energy network can usually provide only low power with insufficient stable parameters (voltage, network resistance). Therefore the quality of spot-made roentgenograms taken by means of a small power X-ray equipment is not satisfactory.

Another problem is the feeding of high-power X-ray equipment which is steadily installed in operating rooms for artery catheterization and angiography and which make exposure-series during these examinations. In such rooms, for the safety of the patients, i.e. for their protection against electrical shock, all electric equipment must be fed by a network separated from the normal mains by a medical isolating transformer in accordance with the recommendations of international standards (IEC TC 62A). Since it is practically impossible to operate X-ray equipment from a separate network isolated as mentioned above because of the high power consumption, there is no other alternative but to feed it from the normal mains. The safety principles to be applied in these rooms are, however, violated by this compromise to such an extent that their efficiency becomes doubtful.

The feeding of X-ray equipment is especially problematic in disaster and emergency situations when the normal mains is generally not available. In such cases the only solution is to apply motor driven generators with high power capacity. This emergency power supply is, however, not capable of meeting the requirements of X-ray equipment.

The fact that the perfect feeding of high power X-ray equipment operating in a pulse-like manner could not have been solved by means of intermediate buffer stores has been causing problems not only in the previously discussed overdimensioning of the energy supplying system. For the above reasons it is not advisable to switch over high voltages. Therefore it is widely accepted to switch high voltage transformers of X-ray equipment at the primary side. It is due to this way of switching that both the transformer and the switches of the X-ray equipment are to be designed for the maximum power demand of the equipment. But even in case of switching at the primary side, difficulties arise when power peaks are at about 100–150 kW for as short a duration as for example some milliseconds. Because of the requirement that the time of exposure be kept precisely at the adjusted values, the necessary switching operations are carried out by means of multistage biased high power magnetic switches. In case of high power exposures of such a short duration it is also important that the voltage of the alternative current network at the moment of switching be at its minimum value. Therefore the control units of advanced X-ray equipment detect the zero crossing instances of the supplying AC network and enable the exposure only at corresponding discrete moments.

It is clear from the above mentioned that there exists a need for solving the problem of intermediate energy storage which takes into consideration the specific properties of X-ray equipment in such a way by which the pulse-like energy required for the exposure can be obtained in expense of an average power consumption of longer duration, the need for using transformers can be eliminated and the equipment can be controlled at small power levels being several orders of magnitude less than the maximum power level.

It is characteristic of the existing X-ray technique that in case of fluoroscopy the patient is irradiated with a given constant radiation intensity and the rays are viewed on a fluoroscopic screen. In case of conventionally used radiation intensities which are low enough not to be harmful to the patient, the light intensity of the image on the screen is so low that it can be viewed only in a dark room. It is known that at such low light intensities the cones of the human eye still cannot perceive light information and the light perception is provided by the rods which have much worse image resolution properties. From the aspect of the image evaluation, an increased light intensity might be of great importance, if this not connected with an increased radiation dose.

The primary object of the present invention is to provide an apparatus which is capable of supplying high-power electric loads operated in a pulse-like manner in expense of a power consumption which is substantially lower than the pulse power of said loads.

Another object of the invention is to provide an apparatus which, in addition to satisfying the aforesaid primary object, can also control the high-power electric loads and can keep their operational voltage and current values at predetermined levels.

A further object of the invention is to provide an apparatus capable of supplying and controlling X-ray equipment without the above-summarized shortcomings of the conventional X-ray technique.

Yet another object of the invention is to provide a method for increasing the light intensity of the image displayed on the fluoroscopic screen during X-ray fluoroscopy.

SUMMARY OF THE INVENTION

According to the first aspect of the invention, an apparatus has been provided for supplying high-power electric loads operated in a pulse-like manner, particularly X-ray equipment, which comprises:

a shaft being geared for rotational movement;

a drive for rotating the shaft having substantially lower nominal power than the operational power demand of the load;

a flywheel coupled to and rotating with the shaft having a rotational energy being in correspondence with the maximum energy demand of the load;

a generator unit having field terminals and an output coupled to the load, said generator unit comprising an electric rotary machine having a rotor coupled to the shaft;

a field power supply having an output coupled to the field terminals of the generator unit and a control input determining the intensity of the exciting current led through the field terminals; and a control unit for adjusting the operational parameters of the load having an output coupled to the control input of the field power supply.

In this apparatus the flywheel plays the role of the store and the appropriate changing of the energizing current prevents the output parameters from being unwantedly affected by the speed drop occurring when the load is switched on.

In a preferred embodiment of the apparatus, the field power supply has a regulating input receiving a signal proportional to the electric output signal of the generator unit. In this case the field power supply fulfills a regulating function and regulates the value of the output voltage and/or current to correspond to a predetermined value adjusted by the control unit.

In view of the utilization and of an easy energy regulation it is advantageous if the generator unit comprises two electrical rotary machines, i.e. an exciting machine and a generator, having rotors mechanically coupled together, wherein the exciting machine comprises a fixed field magnet coupled to the field terminals and an armature rotating together with the shaft, a rectifier rotating together with the shaft having an input coupled to the armature;—and the generator comprises a rotating field magnet connected to the direct current output of the rectifier and a fixed armature coupled to the load.

This construction provides a high magnetic amplification, and the use of the rectifier which rotates together with the shaft eliminates the need for using slide contacts.

It is advantageous to place the rotors of the two machines and the rectifier rotating together with the shaft inside the flywheel and to fasten them to it.

For radiological applications it is advantageous, if the armature of the generator has a high-voltage winding connected to a high-voltage rectifier and placed in a common insulated spaced together therewith.

The two machines can have plane or cylindrical air gaps. In case of plane air-gaps both the stators and the rotors of the two machines can have respective concentrical arrangements and the rotor windings can be built on one side of the flywheel. In case of cylindrical air-gaps both the stators and rotors of the two machines can be placed in respective internal recesses made in the two respective side faces of the flywheel.

The generator unit can also be constructed so that the armature of the generator has a low voltage, high current winding connected directly to a high voltage transformer.

The field power supply of the equipment preferably comprises: a difference circuit having a first input connected to the regulating input and a second input connected to the control input; a regulating unit consisting of proportional, integral and differential members, having an input connected to the output of the difference circuit;—a pulse-width modulator having an input coupled to the output of the regulating unit and adapted to produce a sequence of pulses with a duty cycle depending on the voltage coupled thereto;—a controlled switch having a control input coupled for determining the switching state to the output of the pulse-width modulator;—and a direct current power source having an output coupled through the controlled switch to the field terminals of the generator unit.

In a further preferred embodiment of the invention the apparatus further comprises a speed-measuring unit which senses the speed of rotation of the shaft, and a regulating unit for controlling the speed of rotation. The speed-signal of the speed-measuring unit controls the output voltage of the direct current supply through an excitation calculating unit.

If the apparatus is used for controlling X-ray equipment, the excitation calculating unit takes the adjusted tube current and tube voltage values also into consideration during the calculation, whereby the regulation of the excitation can be set in an optimum working range.

For the generation of extremely short output pulses it is preferable to use a switching circuit or a counter-exciting circuit which should be arranged within the flywheel and connected between the rectifier and the field magnet of the generator for suddenly breaking or reversing the current flowing through the field magnet, when the voltage of the exciting machine decreases or ceases.

According to another aspect of the invention, a method has been provided for carrying out fluoroscopy with a predetermined X-ray intensity which comprises the steps of generating a sequence of discrete X-ray pulses;—adjusting the average intensity of the sequence to correspond to the predetermined X-ray intensity by increasing the intensity of each of the discrete pulses to such an extent that corresponds to the ratio of the time of repetition ($t_a$) of the subsequent pulses in the sequence compared to the duration ($t_b$) of the discrete pulses;—and adjusting the repetition frequency of the pulses to obtain a continuously sensed fluoroscopic image.

This method makes use of the recognition that while the peak intensity of the X-ray radiation is in close correlation with the light intensity of the displayed image, the radiation load is determined by the average value of irradiation, therefore with unchanged average irradiation the sensed light intensity can be increased with pulsed irradiation having increased peak intensity. Such irradiation can be carried out by means of the apparatus according to the invention.

For obtaining a continuously sensed image it is preferable to set the duration of pulses ($t_b$) to be shorter than 25 milliseconds, and the repetition time ($t_a$) of the subsequent pulses to be shorter than 50 milliseconds.

Further details and advantageous features of the invention will now be described in connection with the detailed description of exemplary embodiments, in which reference will be made to the accompanying drawing.

BRIEF DESCRIPTION OF THE DRAWING

In the drawing

FIG. 8b is a circuit diagram of the field magnet coils of the exciting machine shown in FIG. 8a;

DESCRIPTION OF THE PREFERRED EMBODIMENTS

Figure 1:
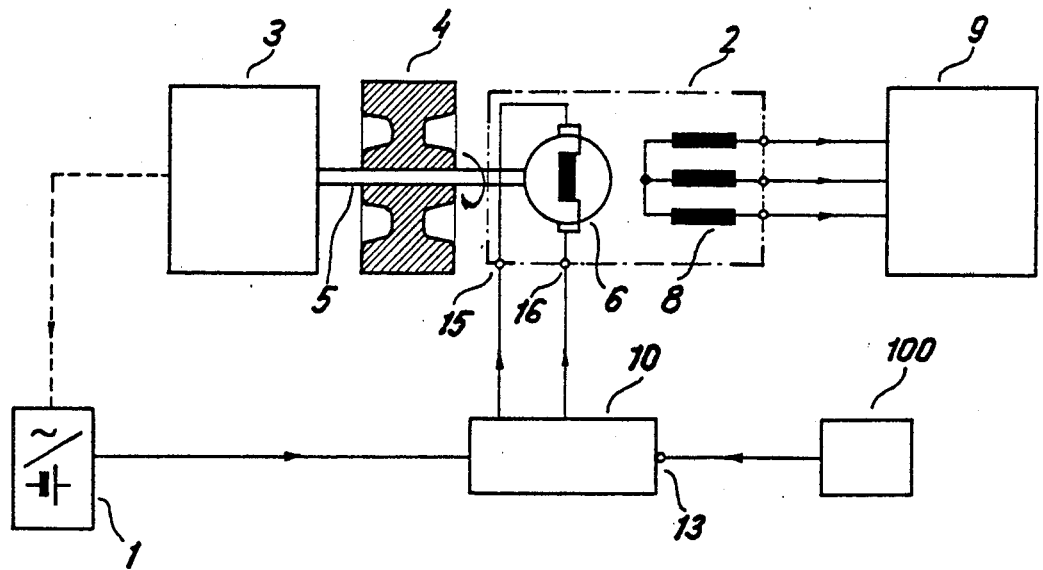
FIG. 1 is a general block diagram of the apparatus according to the invention.

FIG. 1 shows the most general block scheme of the apparatus according to the invention. The main structural parts of the apparatus are a drive 3, a shaft 5 rotated by the drive, a flywheel 4 connected to and co-rotating with the shaft 5, a generator unit 2, a field power supply 10 and a control unit 100. The output of the apparatus is connected to a load 9 with high power consumption and provides its power supply.

The function of the drive 3 is to rotate the shaft 5 and the flywheel 4 attached to it. The drive 3 can be an electric motor (FIG. 2) or if an external power supply cannot be provided, the drive 3 can use an internal combustion motor, a hydraulic motor or any other suitable driving device. In extreme situations, if due to the prevailing circumstances, a motor drive cannot be used, the drive can be operated by human or animal power. The power capacity of the drive 3 can be significantly lower than the normal operating power consumption of the load, because the rotation energy of the flywheel 4 can supply the energy required for a short pulse-like operation in a way described later.

The power supply for the electric circuits of the apparatus is provided by an electric network 1 which is generally the normal mains. The mains can, however, be replaced by an accumulator or battery, or if no electric motor is used in the drive 3, the electrical power can be generated by a dynamo rotated by the drive. It should be noted that the electric circuits of the apparatus require some orders of magnitude less power than the load 9.

The generator unit 2 comprises at least one electric rotating machine (electrical generator) having a rotor rotating together with the shaft 5 and with the flywheel 4. The electric generator included in the generator unit 2 has a rotating field magnet 6 and a fixed armature 8 having preferably a multiphase winding.

The field power required for magnetizing the field magnet 6 is supplied via field terminals 15 and 16 of the generator unit 2. The field terminals 15 and 16 are connected to the output of the field power supply 10. This unit supplies the field magnet 6 with a field current, by which the generator unit 2 will be able to provide operating voltage for the load 9 coupled to its output. The field power supply 10 has a control input 13 connected to the control unit 100, by which it is controlled proportionally to the operating voltage and/or current of the load 9.

Figure 2:
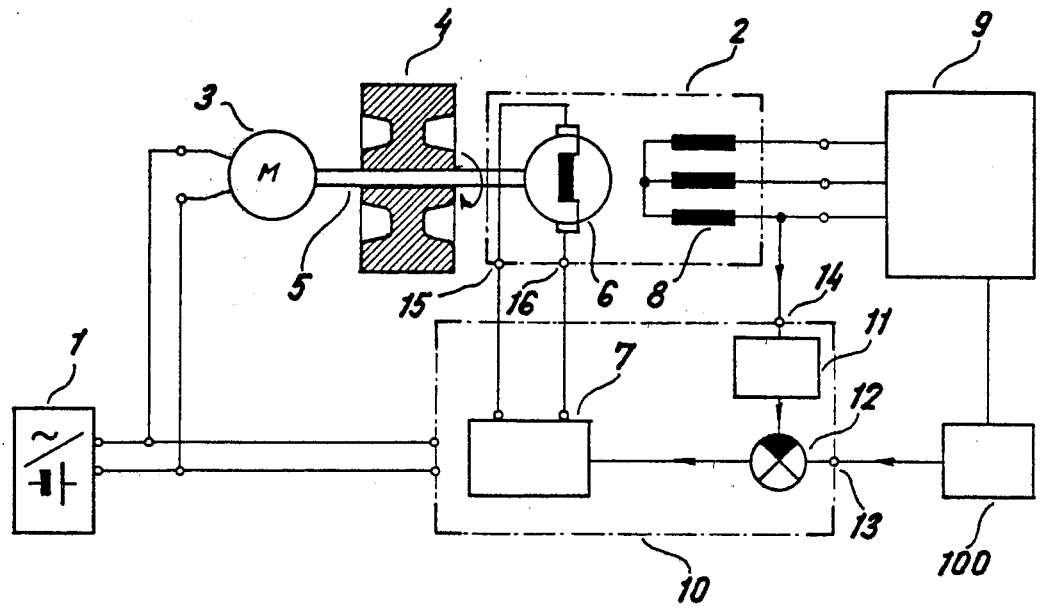
FIG. 2 is a block diagram similar to FIG. 1, indicating the electric motor drive and subunits of the field power supply.

In FIG. 2 an arrangement similar to that of FIG. 1 is shown, but here the field power supply 10 fulfills also regulation tasks, i.e. it strives to keep the operating voltage and/or current of the load 9 to correspond to predetermined, preset values.

This regulation is required because the energy sucked in during the operation of the load 9 brakes down the shaft 5, whereby the rotation of the flywheel 4 will slow down. When the speed decreases, the output voltage of the generator unit 2 will also change. The field power supply 10 comprises a difference circuit 12 and a field regulating unit 7 by which the regulation can be completed. The inverted input of the difference circuit 12 provides the regulating input 14 of the field power supply 10 receiving a signal proportional to the instantaneous voltage and/or current of the load 9. FIG. 2 shows that this sampling signal is taken from the output of one of the phase windings of the armature 8 via a checking signal generating unit 11, but this signal can be taken from the load 9 or from a separate measuring coil on the armature 8 as well.

The output signal of the difference circuit 12 controls the input of a field regulating unit 7 so that it supplies such an energizing field current for the field magnet 6, at which the voltage and/or current supplied to the load 9 will correspond to preset values adjusted by the control unit 100. The load 9 can typically be an X-ray device. In this case it is preferable to dimension the output voltage of the armature 8 to be equal to the operating voltage of the X-ray tube, and to carry out all the regulating, controlling and adjusting functions of the X-ray equipment by appropriately changing the energization of the field magnet 6. In this way the switching functions required for the normal operation of the X-ray equipment can be fulfilled at a power level at least two orders of magnitude lower than that of the switched output.

The time required for the shaft 5 to reach the operating speed is significantly longer than that required by the load 9 to consume the energy of the flywheel 4 via the generator unit 2. This great difference in time, however, as it will be described later, will not affect the proper operation of the load 9. It will be explained later in connection with examples that the energy of the flywheel 4 is sufficient for operating advanced X-ray equipment with high power consumption in all modes of operation, and the normal operation of the equipment is not disturbed by the time needed for the flywheel 4 to reach its operational speed.

Figure 3:
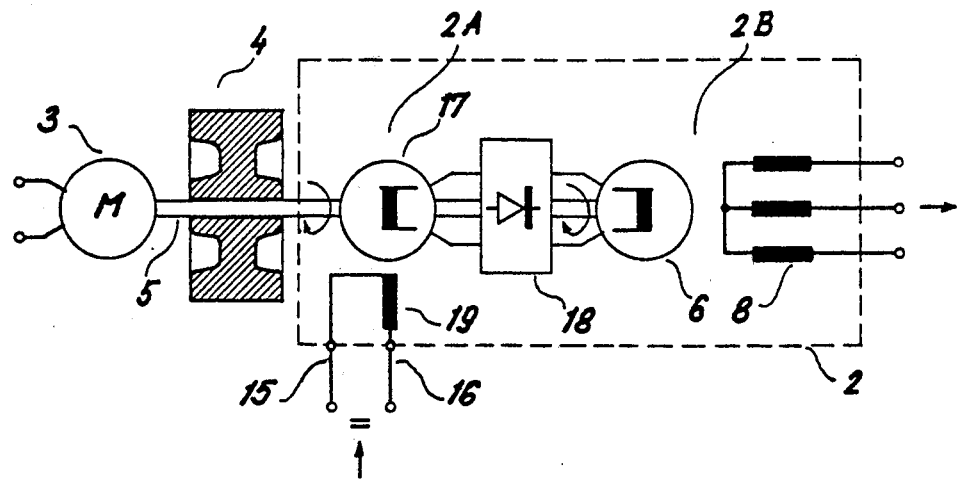
FIG. 3 shows the schematic arrangement of an embodiment of the generator unit 2 with two electric machines.

In FIG. 3 a preferable embodiment of the generator unit 2 is shown, which comprises two electric machines. In this construction the shaft 5 drives an exciting machine 2A and a generator 2B. The exciting machine 2A is an alternative current, preferably multiphase generator having a fixed field magnet 19 and a rotating armature 17. The output terminals of the armature 17 of the exciting machine 2A are connected to a rectifier 18 which rotates together with the shaft 5 and has its rectifying diodes fixed preferably in the flywheel 4 and rotating together with it. The rectified output voltage of the exciting machine 2A energizes the field magnet 6 of the generator 2B. The field magnet 6 corresponds to the field magnet shown in FIG. 1 and it rotates together with the shaft 5. The rotating magnetic field of the field magnet 6 induces electric voltage in the fixed armature 8, which directly or after rectification can be used for supplying the load 9.

It can be said that there are two main reasons why the construction shown in FIG. 3 is more preferable than that of FIG. 1. On one hand the application of an exciting machine 2A eliminates the need of using a slide-contact for the excitation of the field magnet 6, and this results in an increased reliability and life time, a decreased demand for maintenance and the generation of less external disturbances and noises. On the other hand the usage of a separate exciting machine 2A decreases the power demand of energization through the field terminals 15 and 16, and the control can be carried out at a power which is about three or four decimal orders of magnitude lower than the output power. When field energization forms the basis of the regulation, it should be considered that the output voltage is a square function of the speed.

When a separate exciting machine 2A is used, at a preferable embodiment of the invention, both the rotor of the exciting machine 2A and that of the generator 2B can be placed inside the flywheel 4. Such constructions are illustrated in FIGS. 6 to 16.

Figure 4:
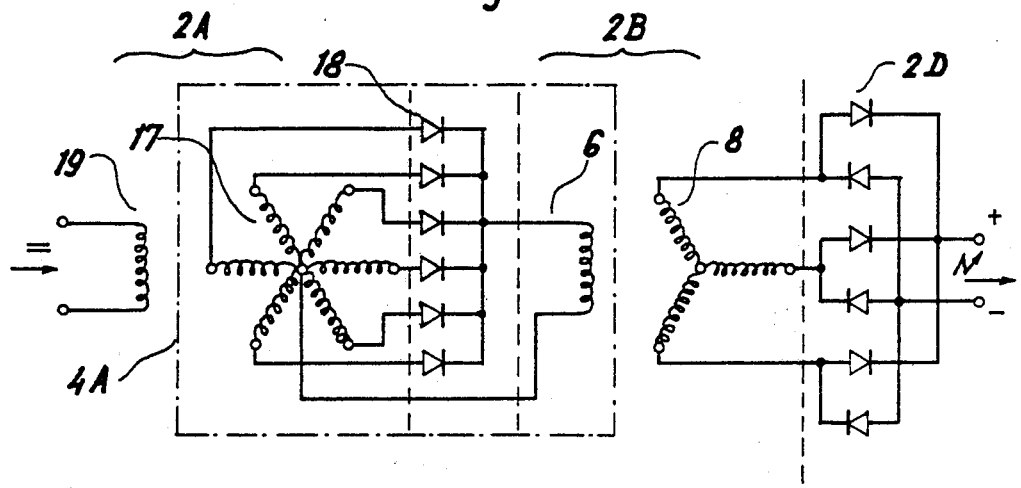
FIG. 4 illustrates the electric circuit diagram of the generator unit which comprises two electric machines and a high-voltage rectifier.

The circuit diagram of the arrangement shown in FIG. 3 can be seen in FIG. 4. The fixed field magnet 19 of the exciting machine has a multipole structure and the armature 17 of the exciting machine has a six-phase winding. The rectifier 18 built in and rotating together with the flywheel 4 is connected in a six-phase rectifying circuit providing a direct current voltage that excites the rotating multipolar field magnet 6 of the generator 2B. The rotor 4A which is mechanically common for the two machines, is indicated with a dash-and-dot line in FIG. 4. The three-phase armature 8 of the generator 2B has a high-voltage winding connected to a high-voltage rectifier 2D which is placed together with the high-voltage winding in a common housing filled with insulating oil. The high-voltage rectifier 2D is of full-wave design. The high-voltage direct current can be used directly for feeding an X-ray tube.

Figure 5:
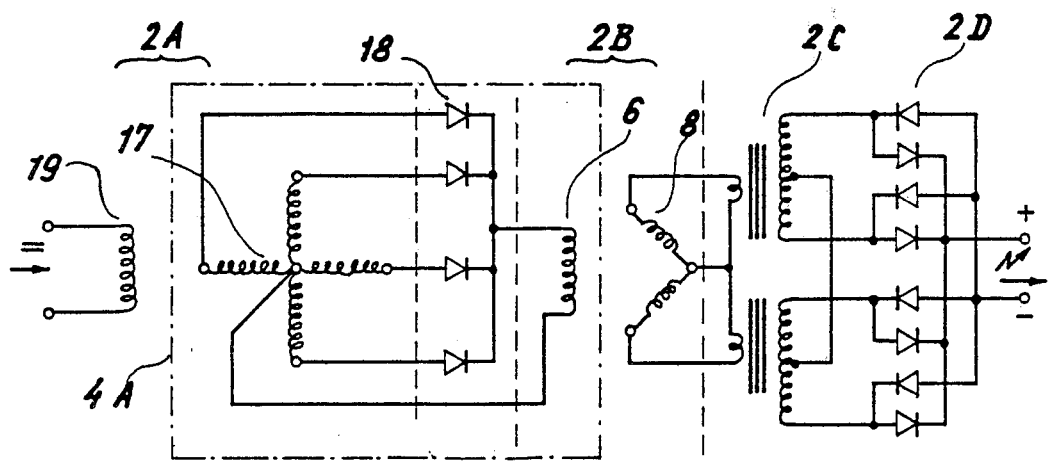
FIG. 5 is a circuit diagram similar to FIG. 4, in which the generator has a low voltage armature coil to which a high-ratio transformer is connected.

FIG. 5 shows a circuit diagram of another embodiment of the generator unit 2 that comprises a rotor 4A, the connection of which is essentially identical with that of the rotor 4A shown in FIG. 4. The significant difference between the two embodiments lies in the design of the fixed armature 8 of the generator unit 2B which has now a low voltage, high current, two-phase armature winding and it is connected to a separate high-voltage transformer 2C having a very high transformation ratio. In this case the high-voltage rectifier 2D is connected to the secondary winding of the transformer 2C.

The embodiments illustrated in FIGS. 4 and 5 are equal inasmuch they both utilize a separate exciting machine and can be operated at a low power level without using slide contacts. The arrangement shown in FIG. 4 can preferably be constructed with a plane airgap, while the arrangement illustrated in FIG. 5 preferably uses a cylindrical airgap.

FIGS. 6-11 show an example for the design using plane airgap and in FIGS. 12-16 an exemplary construction with a cylindrical airgap is shown.

Figure 6:
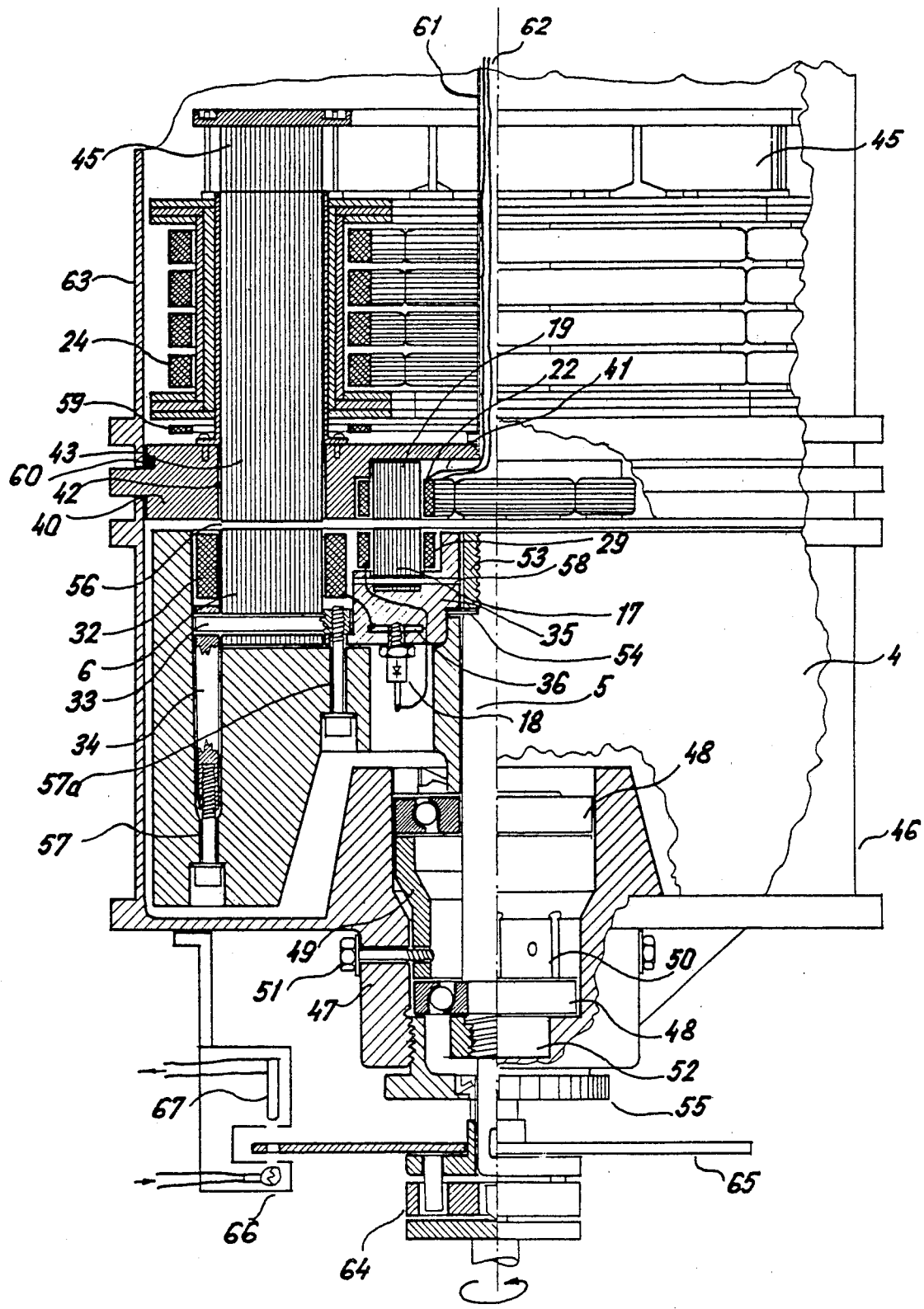
FIG. 6 shows the elevational view of the embodiment of the generator unit with a plane airgap shown in half section and with additional fragmentary sections.

FIG. 6 shows the first exemplary embodiment of the generator unit 2 as it is assembled in an elevational half-sectional view. The exciting machine is arranged concentrically with respect to the generator and it is placed radially inside of it. The two concentrically arranged machines have plane airgaps 56 lying in a common plane which is perpendicular to the rotating shaft 5. The axis of rotation is arranged preferably vertically and the housing of the assembly comprises a flywheel housing 46 located below the airgap 56. A bottom plate of the flywheel housing 46 is built integrally with a bearing block 47 for the shaft. Inside the bearing block 47 there are two bearings 48 with angular influence line, capable of supporting axial forces, too, and a spacing sleeve 49 is located between the two bearings to keep a predetermined distance therebetween. The internal rings of the bearings 48 are attached to the rotating shaft 5.

The hub of the flywheel 4 is lock-fitted to the shaft 5 and it abuts against the internal rings of the upper bearing 48. The axial fastening of the flywheel is effected by a locking nut 53 with a washer 54. There is a cylindrical recess 39 in the upper part of the flywheel 4 (see FIG. 9) and it receives the concentrically arranged rotors of the exciting machine and of the generator. The combined rotor comprises the field magnet 6 and the armature 17 of the exciting machine located concentrically therein. The diodes of the rectifier 18 rotating with and fastened to the flywheel 4 establish electrical connection between the two parts of the rotor.

The stator of the combined machine is located upwardly with respect to the airgap 56 and it forms its upper face. On the other side of the airgap 56 just opposite to the armature 17 of the exciting machine there is located field magnet 19 of the exciting machine, surrounded concentrically by the armature 8 of the generator having vertical pole columns 43 with a high voltage coil 24 thereon. The stator is covered by a casing 63 which forms the upper part of the machine and its interior is filled with insulating oil. Between the casing for the oil space 63 and the flywheel housing 46 there is a support disk 40 sealed by a sealing ring 60. The support disk 40 interconnects the upper and lower parts of the machine and the pole columns 43 of the stator are fastened to it and it holds the field magnet 19 of the exciting machine as well.

The shaft 5 is driven through a clutch 64, e.g. by the shaft of the electric motor 3 (see FIG. 1).

Having now described the main parts of the generator unit, the stator will be discussed in detail in connection with FIGS. 7 and 8a to 8c.

Figure 7:
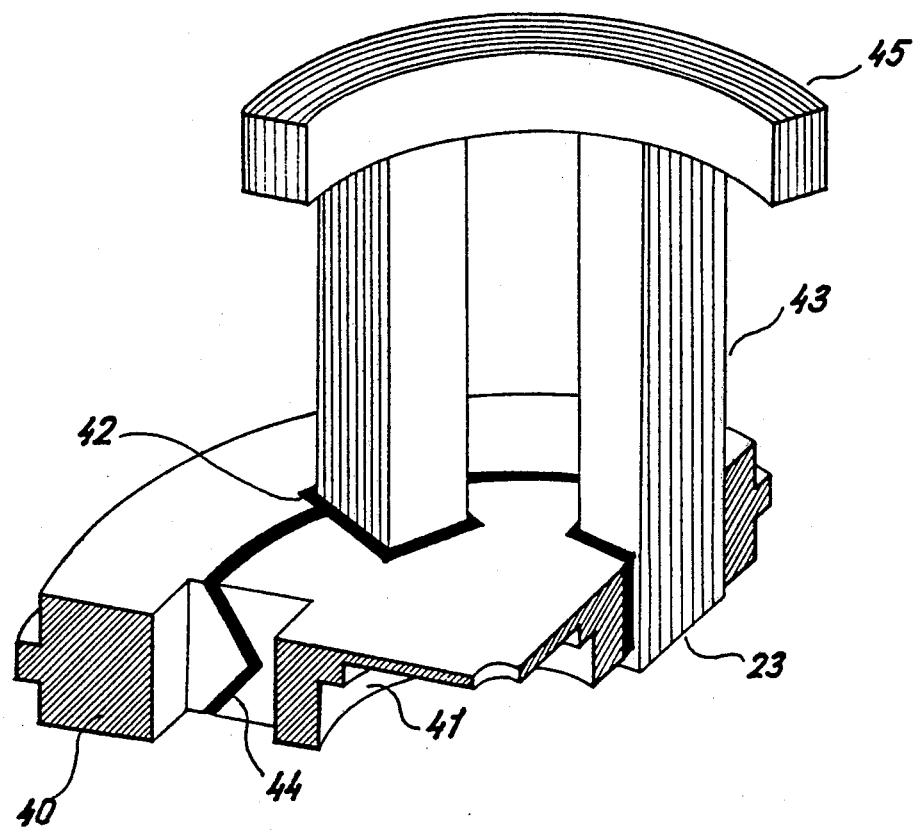
FIG. 7 is an enlarged perspective view of a detail illustrating the armature core formed on the stator of the machine shown in FIG. 6.

FIG. 7 shows a fragment of the support disk 40 which has a central part being separated by a dovetail slot 44 from the remaining outer part. There are holes 42 for fastening the pole columns 43 between these two parts and the end face of the pole columns 43 extends up to the plane of the air gap 56 and constitutes the poles 23 of the armature 8. The inner and outer parts of the support disk 40 are bound together with a high-strength synthetic resin which seals the oil space above the support disk 40 and at the same time insulates the two parts of the support disk 40 preventing thereby that the metal of the supporting ring 40 form a short circuited winding around each pole 43. Due to the dovetail shape of the slot 44 the joint-filling synthetic resin is subjected to compression stresses only. The pole columns 43 are made of a package of transformer steel sheets and the path of their magnetic fluxes is closed by an annular yoke 45 made preferably of wound strips of transformer steel. In the central part of the support disk 40 there is provided a recess 41 facing towards the airgap 56 and the field magnet of the exciting machine is fixed within the recess 41.

Figure 8A:
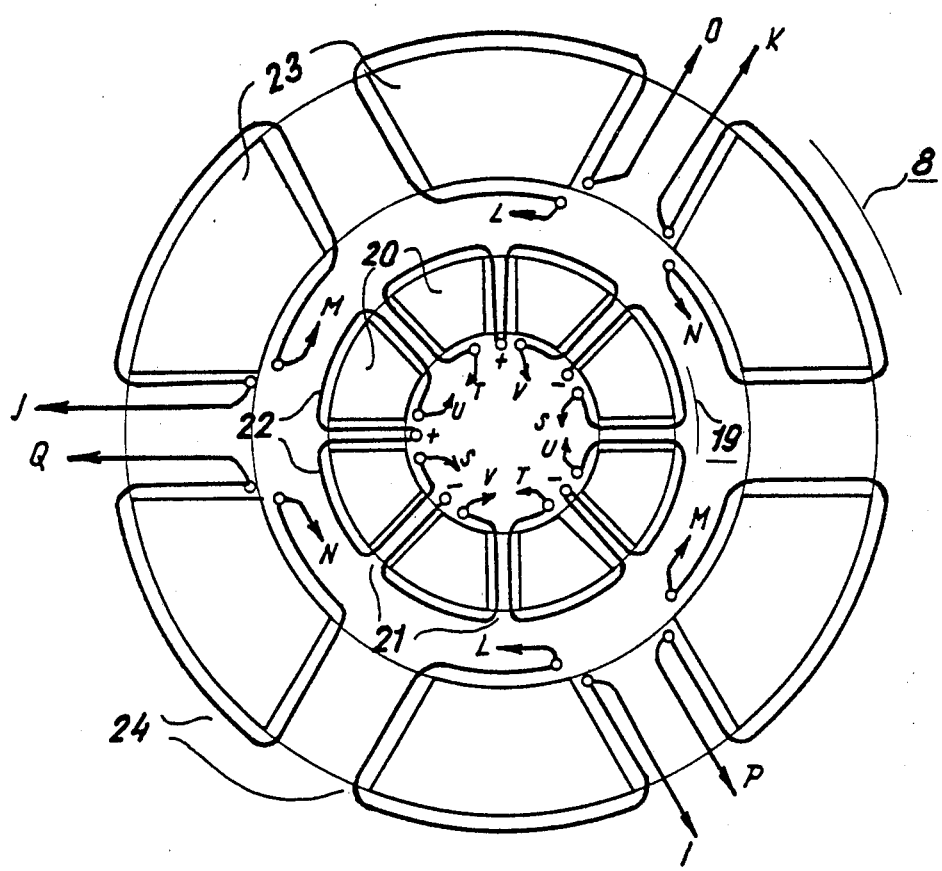
FIG. 8a is a simplified schematic front view of the stator of the machine shown in FIG. 6, seen from the direction of the airgap.
Figure 8B:
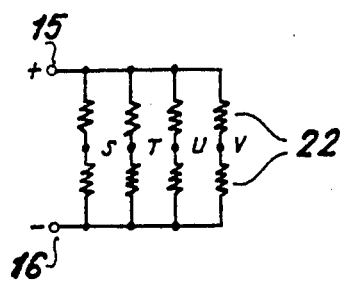

FIG. 8 is a simplified top view seen from the airgap, that shows the concentrically arranged stators. Inside the inner ring (i.e. inside the recess 41) there is the field magnet 19 of the exciting machine including four pairs of poles. Between poles 20 there are slots 21 providing room for coils 22 which are placed around the poles 20. A possible way for interconnecting the eight coils is illustrated in FIG. 8b. In this connection two opposing coils are always connected in series, and the so obtained pairs of coils are connected in parallel to the terminals 15 and 16 from which they are energized by direct current. The winding ends S, T, U and V correspond to each other in both figures (i.e. in FIGS. 8a and 8b).

Preferably the poles 20 are wound from strips of transformer steel fixed by an adhesive treatment carried out in vacuum, and the slots 21 can be tooled in the so obtained annular body.

It can be seen in FIG. 8a that the field magnet 19 of the exciting machine is surrounded by the poles 23 of the armature 8. On the pole columns 43 being the extensions of the poles 23 there are high-voltage coils 24 with separated coil sections. The coils 24 are placed in the insulating oil space and the oil reduces the risk of sparking to the minimum. A three-phase coil arrangement is formed on the six-pole columns as it is shown by the circuit diagram of FIG. 8c. The terminals I, J, K, L, M, N, O, P and Q of each coil 24 are connected to one another in accordance with the drawing. In addition to the coils 24 it is preferable to place the high-voltage rectifier 2D (FIG. 4) in the insulating space of the casing 63 for the oil space, because in that case the machine can easily be coupled to the X-ray tube through an appropriate high-voltage cable.

Figure 8C:
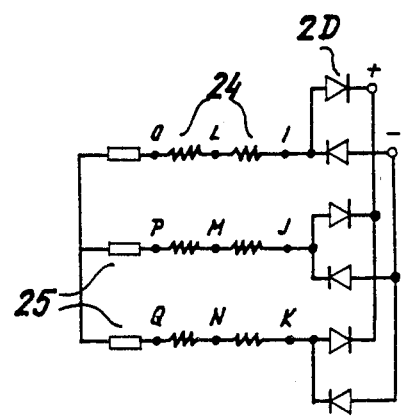
FIG. 8c is a circuit diagram of the generator armature coils shown in FIG. 8a, with a high voltage rectifier connected to it.

FIG. 8c shows that sensing resistors 25 are connected in series with the low potential ends of the coils 24 and the voltage on these resistors is proportional to the loading current. The application of the sensing resistors 25 is optional which can simplify the control circuits.

It can be seen in FIG. 6, although it is not shown separately in FIG. 8a, that low voltage reference coils 59 are also placed on the pole columns 43, which are separated from the coils 24. The voltage induced by these low voltage reference coils is proportional to the induced high voltage. Thus it can be used as a feedback signal for the operation control. The reference coils 59 or other independent windings can be used for accelerating the de-energization of the apparatus when it operates in pulse-mode. For this purpose the winding should be short-circuited with appropriate semiconductor elements when de-energization is required.

FIG. 6 shows a hollow tube 61 extending centrally along the oil space of the stator which opens to the recess 41. Lead-in wires 62 of the field magnet 29 of the exciting machine can be connected through this hollow tube 61.

Figure 9:
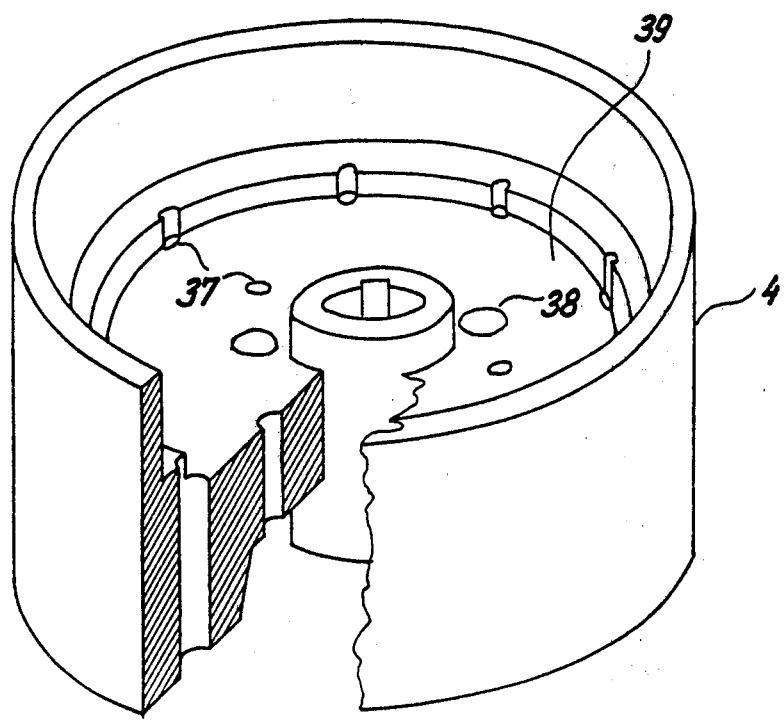
FIG. 9 is a perspective view of the unassembled flywheel of the machine shown in FIG. 6, shown partly in sections.

The structure of the rotor will be described in connection with FIGS. 9–11. The main constructional part of the rotor is the flywheel 4 (see FIG. 9). Its rotation energy is utilized to meet the energy demand of the pulse-like peak loads. The flywheel is made advisably of high-strength aluminum alloy. The use of this material is advantageous because aluminum cannot disturb the magnetic fields of the generator. Another advantage of using alloyed aluminum is the fact that the ratio of tensile strength or limiting creep stress to the density is higher than in the case of other metals. This ratio is of crucial importance, considering both the maximum peripheral speed and the amount of stored energy. Similarly the flywheel may be made for example of synthetic resin reinforced with fiberglass, since in this case the above ratio is still higher.

There is a recess 39 in the flywheel 4, facing the airgap 56, and the rotors of the two machines are located in a concentrical arrangement within the recess 39. FIG. 9 shows that in the bottom plate of the recess 39 bores 37 and 38 are drilled. The bores 37 serve for fastening the rotors and the bores 38 provide room for the diodes of the rectifier 18 rotating together with the flywheel.

Figure 10:
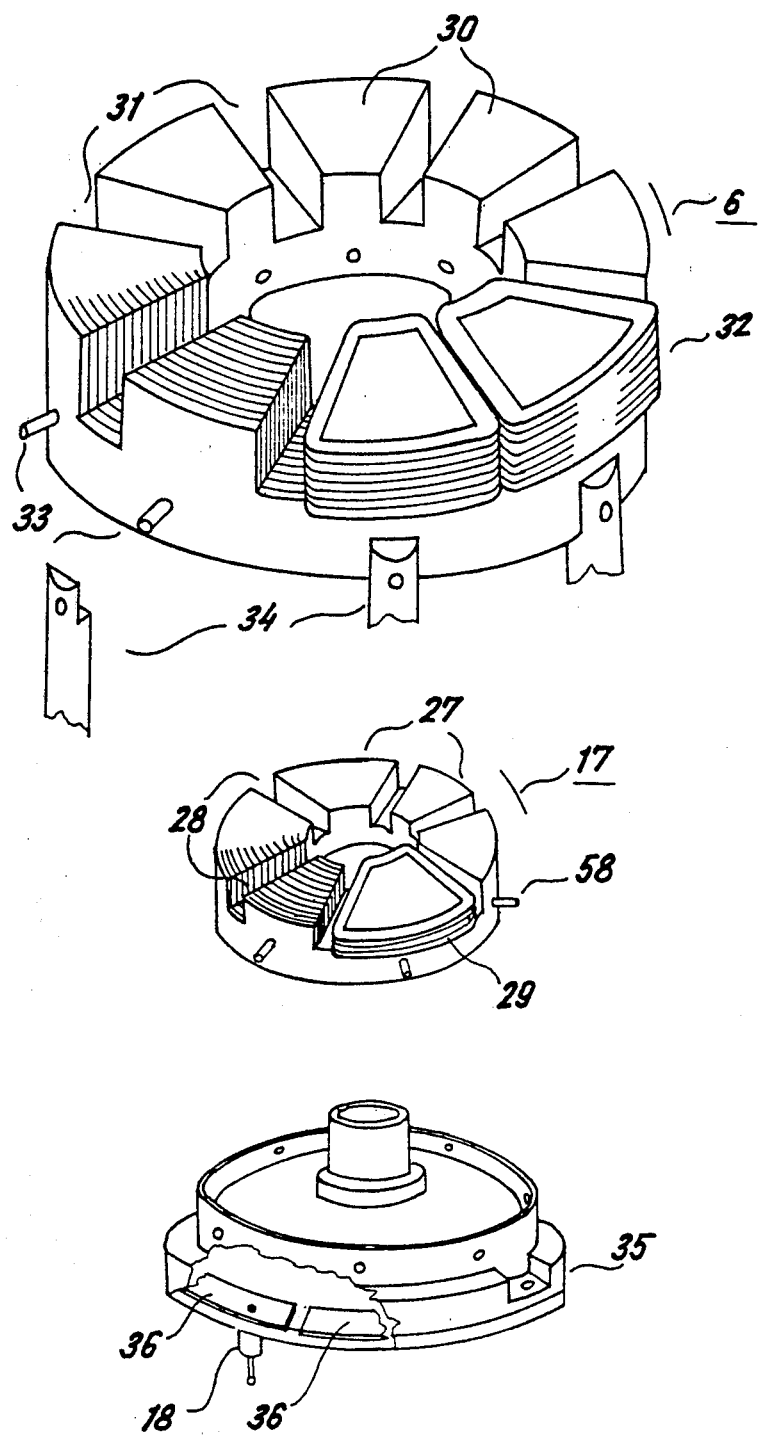
FIG. 10 is an axially displaced perspective view illustrating the iron core assembly of the rotor of the machine shown in FIG. 6.

FIG. 10 shows the main structural elements placed in the recess 39 in a perspective view and in an axially displaced position. The outer disk-shaped member is the pole core of the eight-pole field magnet 6 of the generator, wound of transformer steel strips in which slots 31 are cut following an adhesive treatment. The coils 32 of the field magnet 6 are received in the slots 31 and they are fastened to the pole core 30. For the mechanical clamping and fastening of the pole core 30 radial pins 33 extend therethrough and their outer ends are seated in bores of axial clamping bars 34.

Concentrically inside the pole core 30 there is a centering disk 35 having a cylindrical recess therein being open at the upper surface and this recess receives the armature 17 of the exciting machine. The pole core 27 of the armature 17 of the exciting machine is of six-pole design and its construction is similar to that of the pole core 30. It has slots 28 corresponding to the number of poles and the coils 29 of the armature 17 of the exciting machine are wound around the so obtained poles. The pole core 27 is clamped and fastened to the centering disk 35 by radial pins 58.

On the external rim of the centering disk 35 there are conductive bars 36 insulated from the material of the pole core and the diodes of the rectifier 18 are connected to these bars, whereby the terminals of the coils 32 of the field magnet 6, the terminals of the coils 29 of the armature 17 of the exciting machine and the diodes of the rectifier 18 can be interconnected.

Figure 11A:
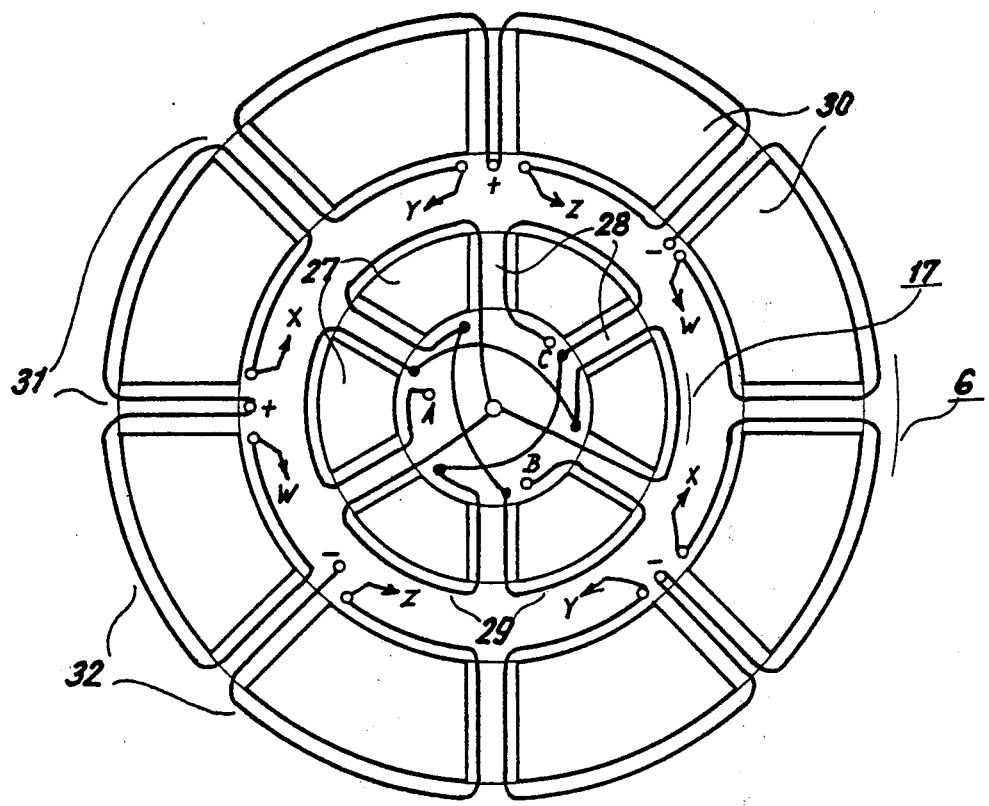
FIG. 11a is a schematic frontal view of the pole and coil arrangement of the rotor of the machine shown in FIG. 6, seen from the air-gap.
Figure 11B:
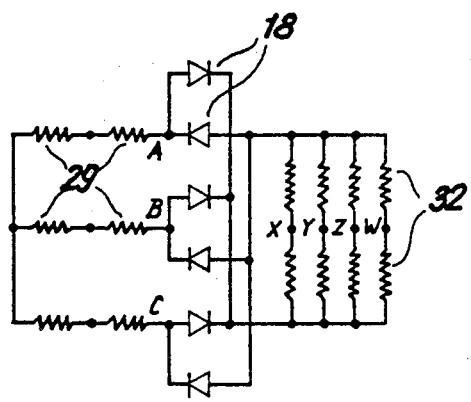
FIG. 11b is a circuit diagram of the rotor coils shown in FIG. 11a, illustrating their connections to the rectifier.

FIGS. 11a and 11b illustrate the arrangement and connection of the two coil systems of the rotor. The terminals W, X, Y and Z and the terminals A, B and C shown in FIG. 11a correspond to those shown in FIG. 11b. It is clear, however, that many other ways of interconnection, differing from FIG. 11b can be used, e.g. a two-pole winding for each phase with a star-point at the middle tap of the coils. The gap formed between the two pole cores due to the difference in diameters provides sufficient room for fitting six rectifying diodes and consequently full-wave rectification can be attained.

Now reference will be made again to FIG. 6 and the way of coupling the rotor to the flywheel 4, a device used for the adjustment of the airgap and the speed signal generator applied for measuring the rotor speed will be described.

The clamping bars 34 are seated in axial bores of the flywheel 4 and their upper bores engage the pins 33 extending radially through the pole core of field magnet 6 and exert a pulling force thereon to fasten the pole core. The stretching force is exerted by axial screws 57 engaged in threaded axial bores of the clamping bars 34. There is a threaded axial bore in the internal end of each pin 33 engaging axial bolts 57a. As the bolts 57a are tightened, the inner ends of the pins 33 will be pressed to a flange of the centering disk 35 to fasten it together with the pole core 37 of the armature 17.

During operation great axial forces are exerted on the rotor, but their effect may not change the size of the airgap 56. It is therefore a difficult task to adjust and fasten the airgap. In case of the embodiment shown in FIG. 6 the spacing sleeve 49 between the two bearings 48 are used for adjusting the airgap. The lower section of the spacing sleeve has several axial slots defining tongues 50 therebetween, and there are threaded bores on the tongues 50 to receive fastening bolts 51 fitted in oval bores drilled in the neck portion of the bearing block 47. When the fastening bolts 51 are tightened, the spacing sleeve 49 is pressed to the inner wall of the bearing block 47 and fixes the axial position of the rotor. The inner rings of the lower bearing 48 abuts to an adjusting nut 52 which is used for adjusting the gap of the bearings and can be fixed in the adjusted position. The outer ring of the bearing 48 is held by a nut 55. After loosening the fastening bolts 51, the axial position of the rotor can be changed, whereby the size of the airgap 56 can be adjusted by a nut 55. When the fastening bolts 51 are tightened, the adjusted airgap will remain unchanged even during great dynamic loads.

There is a tachometer disk 65 fitted to the lower end of the shaft 5, and on an outer circular line of the disk there is a line of equally spaced bores. On both sides of the tachometer disk 65 radially in line with the line of bores there are a light source 66 and an optoelectronic sensing device 67, respectively. The optoelectronic sensing device 67 produces a series of pulses with a frequency proportional to the instantaneous speed of the shaft 5, and this series of pulses will be utilized in the apparatus according to the invention for control purposes, in a manner described later. Of course, the instantaneous speed of the shaft 5 can be measured in many other ways, too, but the invention does not relate to the way of measuring the speed of rotation.

The second embodiment of the generator unit 2 which has a cylindrical airgap is shown in FIGS. 12–16, and its circuit diagram can be seen in FIG. 5. Similarly to the previous example the generator unit comprises again two main constructional parts which are coupled by the support disk 40. The rotor is included in the flywheel housing 46 and the flywheel 4 is fastened to the fixed structural elements of the machine by two bearings 48. Due to the application of the cylindrical airgap 56 the bearings 48 need not bear against axial forces. A fixed hub 68 is coupled to the support disk 40 having a cylindrical inner wall that supports the outer ring of the lower bearing 48. The hub 68 has a cylindrical mantle surface and an outer flange which support and fix the position of the iron body 70 of the armature 8. The field magnet 6 is placed concentrically around the armature 8 on the other side of the cylindrical airgap, and the circular iron body of the field magnet 6 is fastened to the flywheel 4 by bolts 74. In this embodiment the exciting machine is placed in a conical recess on the other, i.e. upper side of the flywheel 4. The flange of the flywheel housing 46 is bolted to a cover disk 76, the latter of which supports a hub ring 77 holding the field magnet 19 of the exciting machine. The hub ring 77 supports at the same time the outer ring of the upper bearing 48. The inner rings of both bearings 48 are fixed to the hub of the flywheel 4 by a nut 69 on the shaft 5.

There is a cylindrical airgap 56 between the field magnet 19 and the armature 17 of the exciting machine and the construction of the poles of the exciting machine essentially corresponds to that of the field magnet 6 of the generator. In order to emphasize the analogy between FIGS. 6 and 12, the elements having the same function and purpose are indicated with identical reference numbers on both drawings. The armature 17 of the exciting machine rotates together with the flywheel 4 and the outlets of the armature coils 22 are connected to the coils 32 of the field magnet 6 through the rectifier 18 which rotates also together with the flywheel 4. In this embodiment the diodes of the rectifier 18 are fixed by the supporting ring 36 (see FIG. 15) which is fixed in the cylindrical end section of the upper conical recess of the flywheel 4.

The winding of the armature 8 comprises a low voltage, high current coil system constituted by conductors 72, which are led through slots 71 of the armature and extend out from the slots in an axial direction, pass through properly sealed bores of the support disk 40 and extend in the inside of the second main part of the apparatus, i.e. in the inner space of the high ratio transformer 26. This part is covered by the casing 62 which in operation is filled with insulating transformer oil. The construction of the primary coil 75 of the transformer 26 is shown schematically in FIG. 12. The axial wires 73 are extensions of the conductors 72 of the armature 8. Very high primary currents should be provided in the primary coil 75 due to the high ratio of the transformer 26. The primary coil 75 is therefore essentially a strip of one or a few turns being connected to the wires 73 and its width corresponds to the length of the secondary coil.

Figure 12:
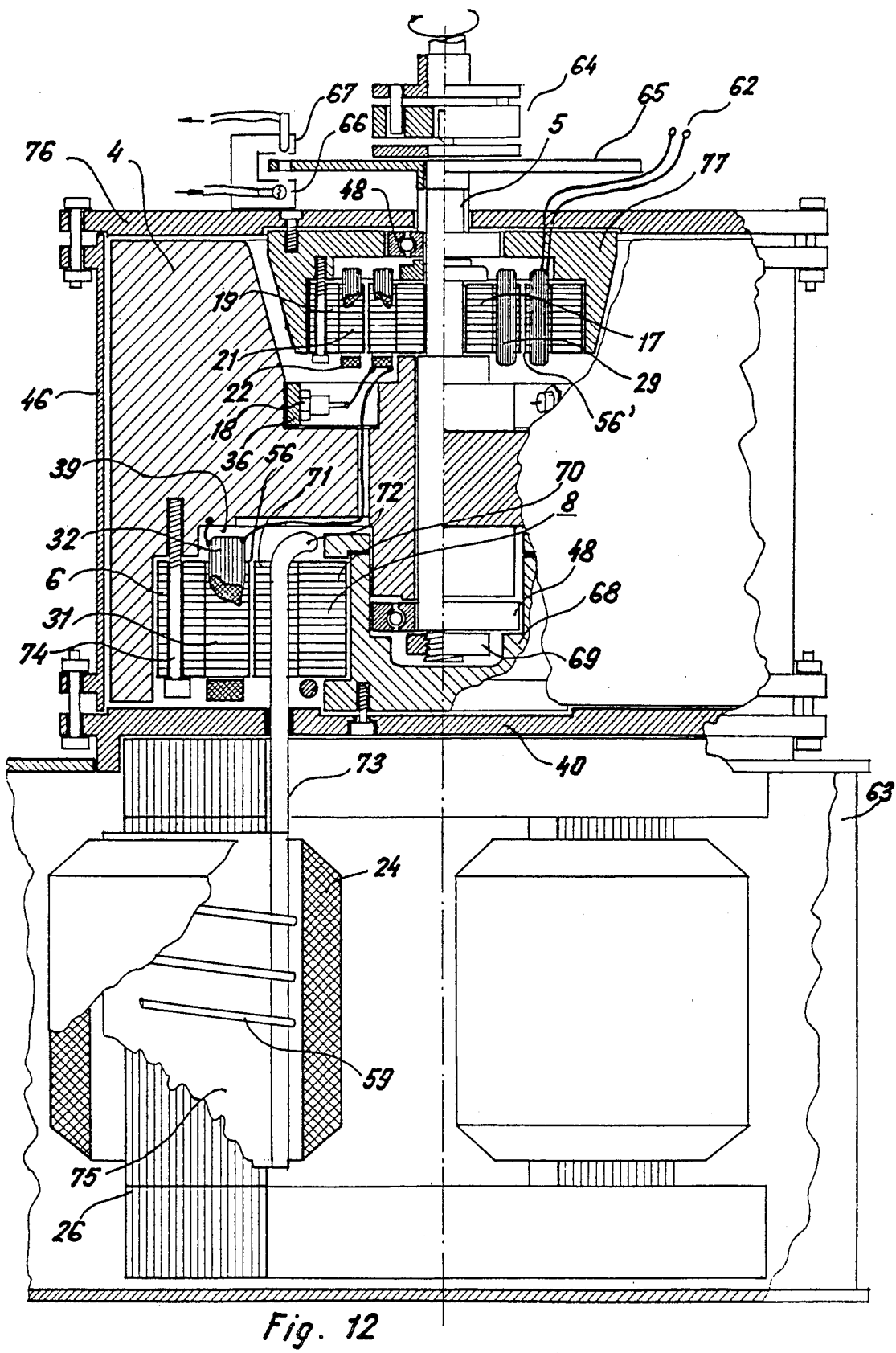
FIG. 12 shows the elevational view of the embodiment of the generator unit which uses a cylindrical airgap, shown in half section and with additional fragmentary sections.

FIG. 12 shows a part of the reference coil 59 with a low number of turns being insulated both from the primary and secondary coils.

The high-voltage rectifier 2D can also be placed (not shown) in the interior of the casing 63.

Figure 23:
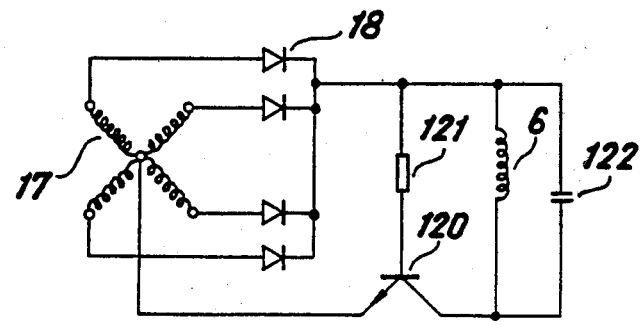
FIG. 23 is a circuit diagram of a first circuit which can be used for the fast de-energization of the generator.

FIG. 23 shows a preferable embodiment of the coils of the cylindrical exciting machine. The coils of the field magnet 6 and of the armature 8 of the generator placed on the other side of the flywheel 4 can be implemented similarly to the coils of the exciting machine. The external winding of the machine shown in FIG. 13 has a pole core consisting of four pairs of poles.

Figure 13:
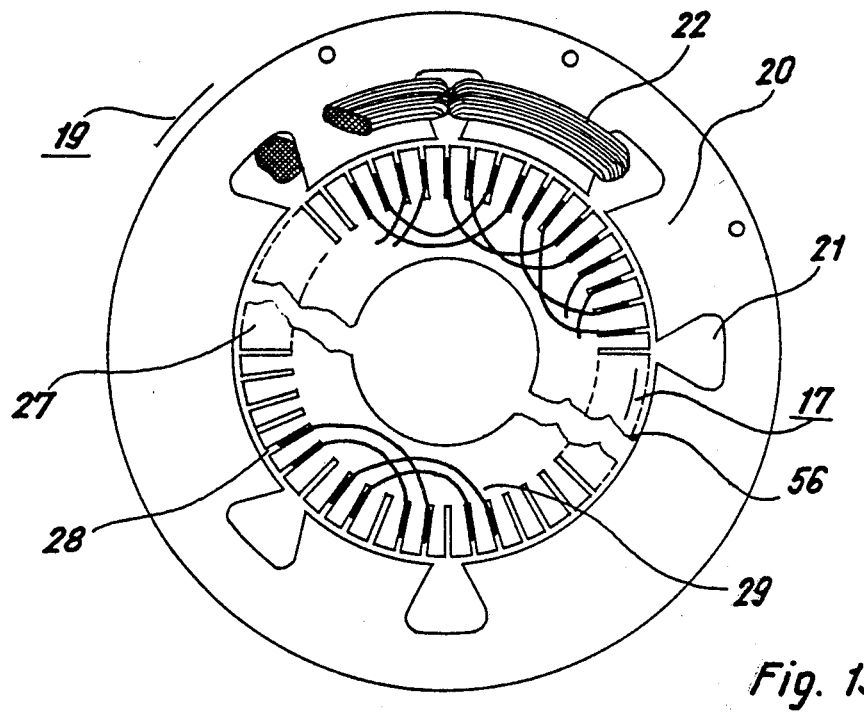
FIG. 13 is a simplified frontal view of the cylindrical design of the stator and rotor windings of the machine shown in FIG. 12.
Figure 14:
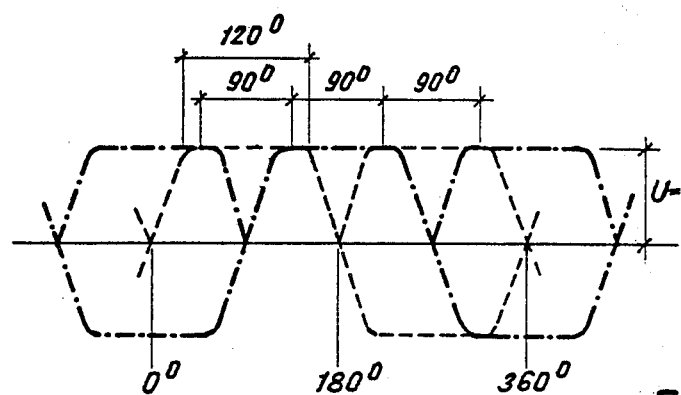
FIG. 14 is a diagram showing the phase voltages of a two-phase machine wound according to FIG. 13, and the form of its rectified voltage.

FIG. 13 shows two alternatives for making the coils 29 of the rotor. The upper winding has a three-phase construction and each coil is placed in adjacent pairs of slots 28. The two-phase winding shown in the lower part of FIG. 13 is also advantageous, and it can be implemented either in three slots or in two slots for each phase, but in the latter case every third slot should be left empty. When using a two-phase coil system and if a homogeneous airgap induction is provided in front of the poles, the shape of the induced voltage will be trapezoidal as indicated in FIG. 14, and the top section of the trapezoidal signal will be approximately 120-electric degree wide. If such a two-phase system is rectified with a full wave rectification, then due to the reversals occurring at every 90th degree, the pulsation of the obtained direct voltage will be reduced to the minimum, i.e. the value of the direct voltage will be approximately constant. This constant direct voltage can be maintained despite the distorting effect of the armature reaction on the airgap induction.

The two-phase winding is especially advantageous for the generator that supplies directly the transformer 26, because in that case the transformer 26 can be constructed as two separate, two-column transformers in which the respective pairs of coils used for the full-wave rectification can be placed on separate columns. The transformer 26 can be constructed as a three-column transformer as well, where the phase coils should be placed on the two outer columns, and the middle column should have a greater cross section to be able to be linked to the magnetic circuits of both phases. Another advantage of the two-phase system is that in case of applying a grounded neutral line, only eight diodes are required in the high voltage rectifier 2D, while in a three-phase system twelve diodes are used.

Figure 15:
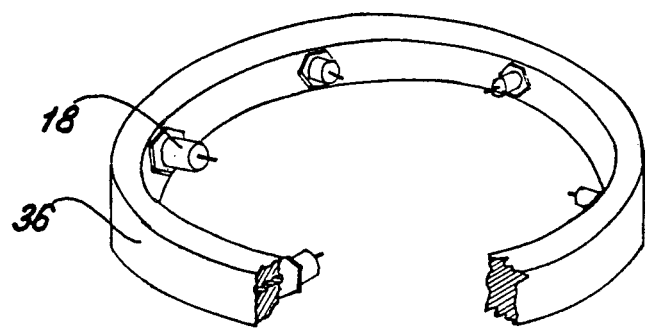
FIG. 15 is a perspective fragmentary view of the supporting ring 36 which holds the diodes of the rectifier belonging to the machine shown in FIG. 12.

FIG. 15 illustrates the arrangement of the diodes of the rectifier 18 on the conductive bars 36.

Figure 16:
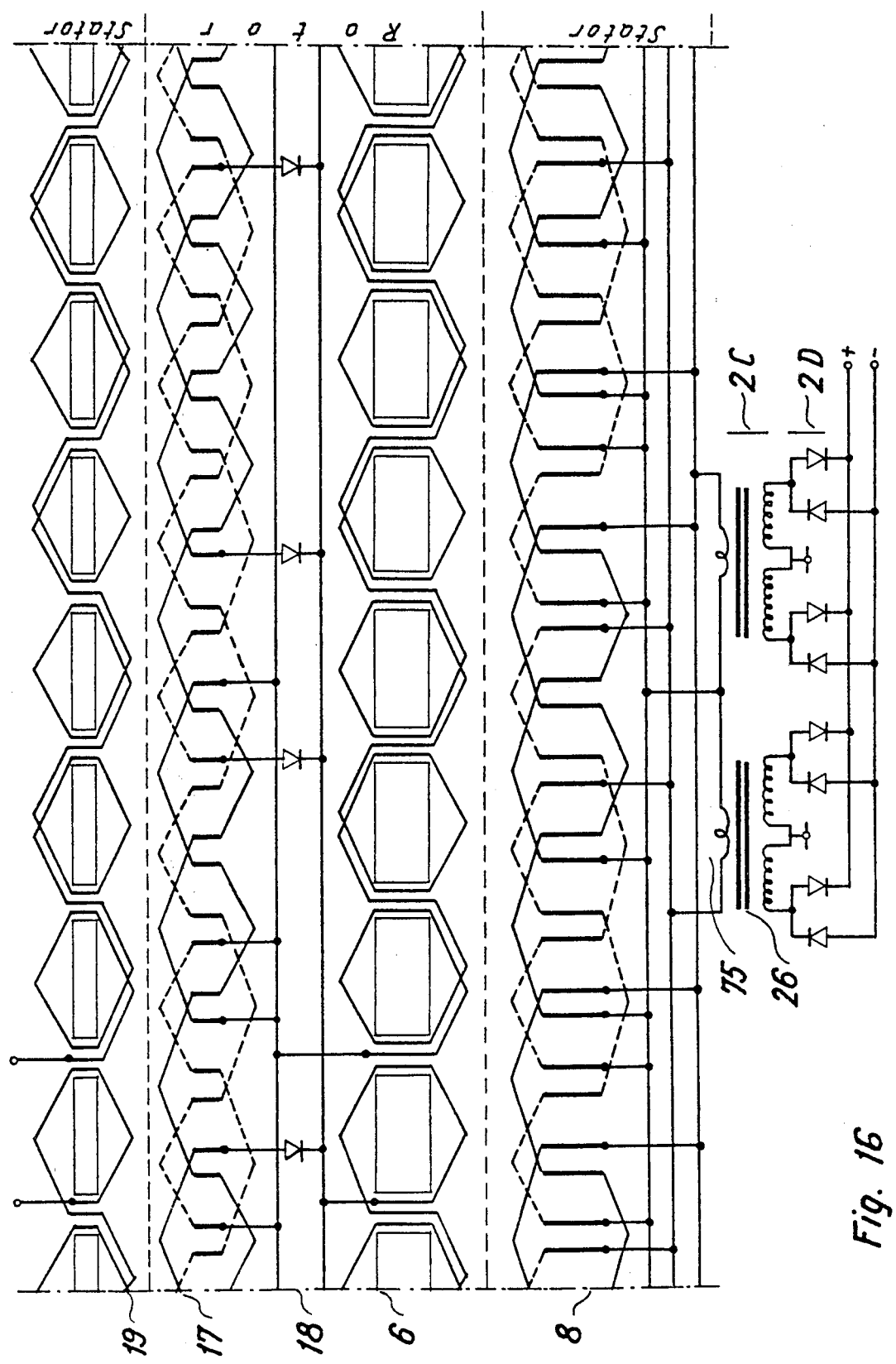
FIG. 16 is an outstretched plain view of the windings of the two electric machines shown in FIG. 12, indicating the interconnections of the coils.

FIG. 16 shows a further example of the stator and rotor winding of the two machines illustrated when being developed in a plane. On the stator the coils of the field magnet 19 of the exciting machine are connected in series and the coils are made with lap-and-wave winding. On the rotor the armature 17 of the exciting machine has a wave winding. The direct current of the rectifier 18 excites the field magnet 6, which has a lap-and-wave winding. The field magnet 6 is obviously placed on the rotor. The armature 8 is placed on the stator, with a two-phase wave winding which is connected in parallel.

Figure 17:
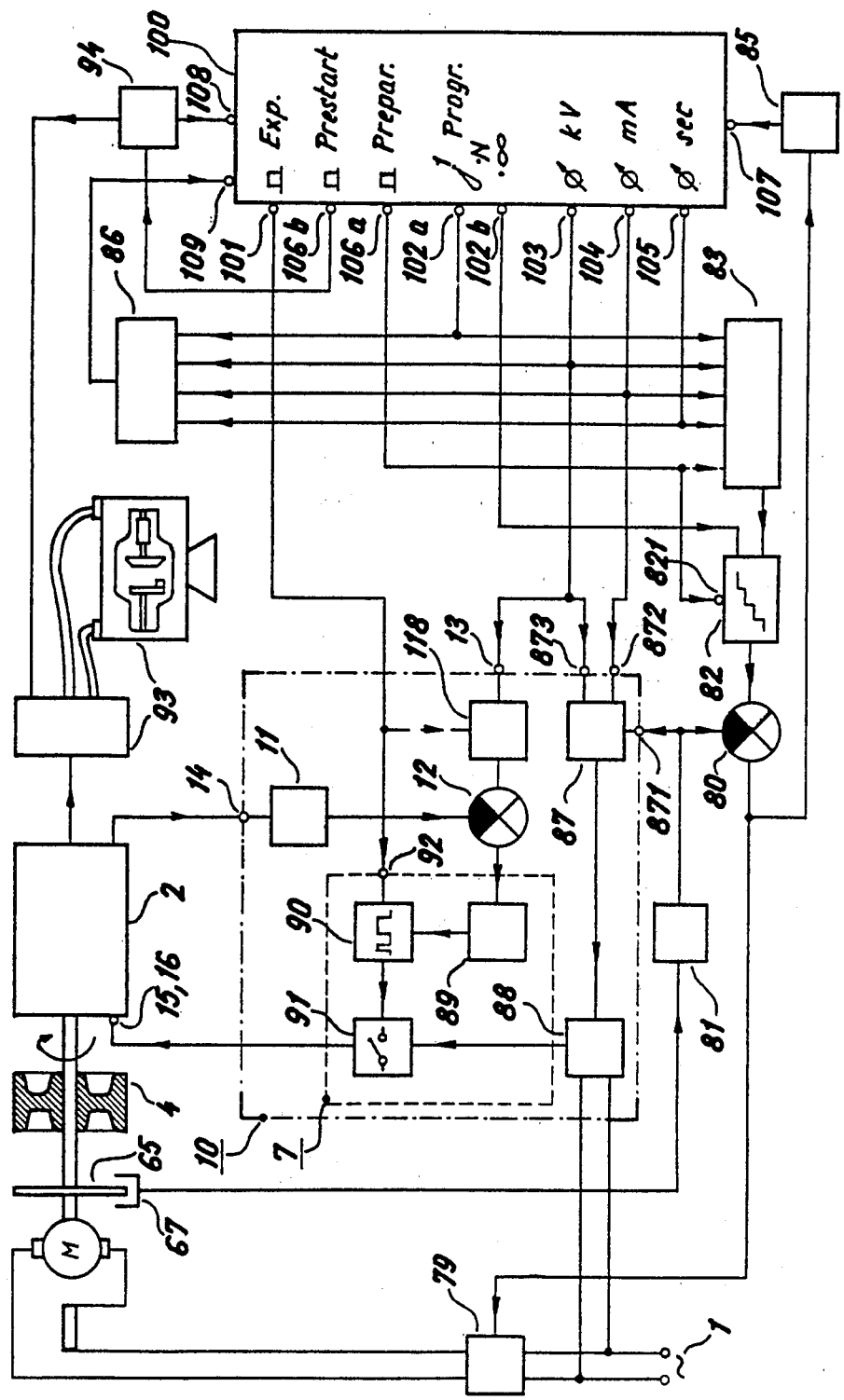
FIG. 17 shows the block diagram of the electronic units of the embodiment of the invention which is used for controlling an X-ray equipment.

So far the construction and two preferable embodiments of the generator unit 2 have been described. The circuits determining, adjusting and controlling the operational conditions of the generator unit 2 and the load 9 are of great significance, in the proper operation of the apparatus according to the invention. The cooperation and mutual interaction of these circuits can be best understood in connection with an example that relates to a preferable embodiment of such circuits. Reference will now be made to FIG. 17 in which the load 9 is an X-ray tube 93 supplied directly with the high-output voltage of the generator unit 2. FIG. 17 shows the block diagram of the units required for ensuring the proper operation of the X-ray tube 93. Each of the illustrated units plays an important role in the operation, but some of these can be omitted or replaced by other equivalent units without departing from the spirit of the invention. Therefore the invention cannot be limited to any of the concrete arrangements demonstrated here.

The block diagram shown in FIG. 17 comprises two independent control loops and control circuits for supplying the units of the control loops with appropriate nominal (basic) signals. The adjustment of the control circuits is carried out by means of a control unit 100 in accordance with the actual requirements of the X-ray examinations set by the practitioner of personnel who conducts the X-ray examination. The control unit 100, in view of its constructional design and its way of handling, is very close to the conventional control units, and by means of the various handling means thereof, the mode of operation of the X-ray examination (i.e. singular exposure, exposure series or fluoroscopy mode), the tube voltage, the tube current and the time of exposure can all be adjusted. Also, the control unit 100 serves for controlling the preparation and the start of the exposures.

The control unit 100 has a mode of operation output 102 supplying a voltage which depends on the adjusted mode of operation. At a preferred embodiment the control unit 100 has two separate modes of operation outputs which are connected to two separated lines 102a and 102b, respectively, from which the line 102a receives an analog voltage corresponding to the number N of the exposures which are to be carried out in an exposure series having a value of, say, 0.5 V at single exposure operation, and in case of a series of ten exposures, a ten times high value, i.e. 5 V. When fluoroscopy mode is adjusted, the second line 102b will supply a control voltage and the first line 102a returns to zero-voltage condition.

At the tube voltage output 103 a voltage proportional to the present tube voltage will appear, at the tube current output 104 a voltage proportional to the tube current will appear, and at the exposure time output 105 a voltage proportional to the exposure time will appear. The state of the prestart outputs 106 of the control unit 100 is determined by two pushbuttons of the exposure preparation. The exposure program is started by pressing a separate START pushbutton.

After pressing the preparation pushbutton, the exposure cannot be started until the conditions required for starting are all satisfied. The control unit 100 is informed of the existence of these conditions through its inputs, i.e. through the speed input 107 about the condition when the shaft 5 has reached its specified speed, through the auxiliary circuit input 108 about the proper operation of the auxiliary circuits 94 required for the operation of the X-ray tube 93, and through the tube protection input 109 about the enable signal of an automatic tube protecting unit 86. If all of the above-mentioned conditions are simultaneously present, when the START pushbutton is pressed, a voltage will appear on the exposure output 101 that starts the exposure. If any of the above conditions is not fulfilled, starting will be prevented, and this condition will be indicated on the control unit 100, enabling the operator to review the correctness of the adjusted exposure parameters or to learn the reason for an eventual malfunction.

The automatic tube protecting device 86 is of the usual design, and, relaying on the preset exposure parameters, it can determine whether the planned exposure or series of exposures will load the X-ray tube 93 within permitted limits.

The auxiliary circuits 94 are of known construction and they start rotating the anode and heating the filament. The auxiliary circuits 93 are switched on by a prestart signal coming from the prestart output 106b of the control unit 100 which is activated when an enable signal has previously reached the speed input 107.

The first control loop serves for the adjustment of the speed of the electric motor rotating the shaft 5. With the help of the tachometer disk 65 and the optoelectronic sensing device 67 fitted to the shaft 5 the rotation of the electric motor generates a pulse-train at the output of the optoelectronic sensing device, and this pulse-train has a frequency proportional to the instantaneous speed. This pulse-train is converted to a direct voltage by the speed signal generator 81 that depends on the speed. The direct voltage signal output of the speed signal generator 81 is connected to the inverted input of a difference circuit 80 (preferably a differential amplifier). The non-inverted input of the difference circuit 80 receives a speed reference signal from the output of a quantizing unit 82, and its output generates the difference of the signals connected to the non-inverted and inverted inputs and sends this difference signal to the control input of a speed control unit 79. The speed control unit 79 is connected to the control circuit of the electric motor and changes the speed of rotation of the electric motor corresponding to the difference signal coupled to its control input. The speed control unit 79, besides controlling the speed, acts as an ON-OFF switch for the electric motor, and it is equipped with an overload protecting circuit that prevents the electric motor from being driven by a power higher than permitted.

For the above-described speed control loop, the quantizing unit 82 supplies a reference signal which takes predetermined discrete values. Each discrete value represents a given operating speed of the electric motor.

It is not advisable to store higher rotational energy in the flywheel 4 than it is required for the next X-ray examination. It is worth setting the maximum speed only when the maximum energy is to be taken out from the flywheel 4. The control input of the quantizing unit 82 is connected to the energy calculating unit 83 which receives respective signals from the mode of operation output 102, tube voltage output 103, tube current output 104 and exposure time output 105 belonging all to the control unit 100. On the basis of these signals the energy calculating unit 83 calculates the energy required for the next exposures. The operation of the quantizing unit 82 is enabled by a preparation signal reaching its permission input 821 from the prestart output 106a of the control unit 100. When the preparation signal is ceased, the electric motor is switched off.

Figure 18:
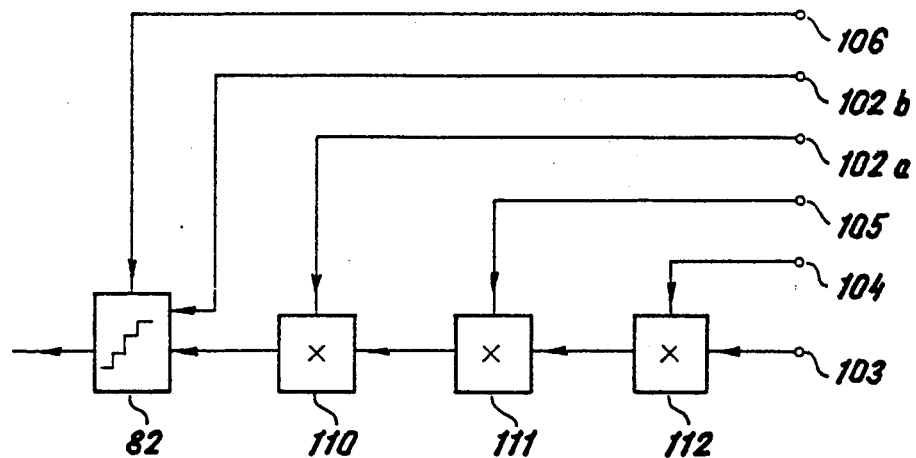
FIG. 18 is the block diagram of an embodiment of the energy calculating unit shown in FIG. 17.

A preferred embodiment of the energy calculating unit 83 is illustrated in FIG. 18. In essence it comprises three analog multiplying circuits 110, 111 and 112 which generate the product $W = U \cdot I \cdot t \cdot N$ in the form of an analog voltage signal, where U is the preset tube voltage, I is the tube current, t is the exposure time, N is the number of exposures included in a series, and W indicates the energy demand of the series. In case of individual exposures the value of N is unity. The quantizing unit 82 generates a discrete speed reference signal corresponding to the energy W. In case of fluoroscopy mode of operation the quantizing unit 82 is controlled by the line 102b of the control unit 100, and its associated control input has a higher priority than the control input which is connected to the output of the multiplier 110, and in this case the state of the quantizing unit 82 is determined by the constant signal level received from line 102b. The quantizing unit 82 is advisably a staircase voltage generator. Also, the output signal of the energy calculating unit 83 forms directly a speed reference signal. In this case the enabling signal of the speed reference signal should be generated in the energy calculating unit 83.

Now FIG. 17 is referred to again, which shows that the output of the difference circuit 80 is connected to the speed input 107 of the control unit 100 through a comparator 85. When the shaft 5 reaches a speed corresponding to the preset speed reference signal, the output voltage of the difference circuit 80 is approximately zero, and in this case the comparator 85 sends an enabling signal to the control unit 100. The comparator 85 preferably comprises a comparator or a window comparator. When the comparator unit 85 has hystereis properties and the control unit 100 is designed appropriately, it can be attained that the speed drop occurring during the subsequent exposures cannot inhibit the X-ray operation, although a relatively high difference signal can appear at the output of the difference circuit 80.

The second control loop is used to regulate the excitation of the generator unit 2 so that the preset operating characteristics of the X-ray tube 93 should be kept at respective constant values during the X-ray exposure. When the X-ray tube 93 operates and consumes energy, the speed of the flywheel 4 decreases, and consequently the generator voltage decreases, both in the exciting machine and in the generator. The magnetic field of the load current strives to reduce the fields generated by the field magnets, and an armature reaction effect occur in the generator. As the shortest exposure time for the X-ray tube has a duration of 1-2 milliseconds, the second control loop should have a corresponding time constant. It should be understood that the first control loop cannot influence the speed drop that occurs during the exposure, because first the power capacity of the electric motor is significantly lower than the power input, and secondly the time constant of the speed control can be longer than the exposure time because of the mechanical units being present.

The second control loop comprises the feedback signal generating unit 11, the difference circuit 12, a regulating unit 89, a pulse-width modulator 90, a controlled switch 91, a controlled direct voltage source 88 and a reference signal generating circuit 118. The voltage of the intervening signal of the second control loop is adjusted by the excitation calculating unit 87 by means of changing the output voltage of the controlled direct voltage source 88. This intervention is required to assure that control occur always in the optimum range.

The feedback signal generating unit 11 converts the output voltage (e.g. that of a measuring coil) of the generator to an analog direct voltage, which is proportional to the instantaneous direct current voltage connected to the X-ray tube 93. The input of the reference signal generating circuit 118 is connected to the tube voltage output 103 of the control unit 100 and the circuit 118 generates a direct current voltage reference signal proportional to the tube voltage preset by the operator and sends it to the non-inverted input of the difference circuit 12. At the output of the difference circuit 12 an error signal proportional to the difference of the required and actual tube voltage will appear. From the error signal the regulating unit 89 produces a regulating signal which controls the operation of the pulse-width modulator 90. The regulating unit 89 comprises proportional, integrating and differential elements (PID regulation), by which the fast changing sections of the error signal, when passing through the differential elements, generate a relatively high regulating voltage immediately, and the value of the regulating voltage is also dependent both on the error signal and on its integrated value.

The pulse-width modulator 90 generates a pulse train in which the width of the pulses is determined by the output voltage of the regulating unit 89. The frequency of the pulse train should be chosen in conformity with the shortest exposure time and, for example, its value can be in the range of 20-100 kHz. The enable input 92 of the pulse-width modulator 90 is connected to the exposition output 101 of the control unit 100, which is why the pulses can appear only during the presence of an exposition signal at the output of the pulse-width modulator 90. Therefore the generator unit 2 is switched on and off by the exposition signal, and this ON-OFF switching can be solved by coupling the exposition signal to an enable input of the reference signal generating circuit 118 instead of to that of the pulse-width modulator 90.

The output voltage of the controlled direct current voltage source 88 can reach the field terminals 15 and 16 of the generator unit 2 across the control switch 91 only during the duration of the pulses of the modulator 90. Thus the average intensity of the exciting magnetic field established in the field magnet of the exciting machine depends both on the output voltage of the controlled direct current voltage source 88 and on the spacing (duty cycle) of the width-modulated pulse train. This regulation can be effective only if the required output voltage can be obtained by using a pulse train with a duty cycle less than unity. On the basis of the values set by the control unit 100 and of the speed reference signal the excitation calculating unit 87 adjusts the voltage of the controlled direct current voltage source 88 in accordance with the expected energy demand, e.g. with the assumption of a basic pulse space factor of about 20%–30%. Consequently the efficiency of the regulation will remain approximately constant in case of various adjusted exposure energies, and a sufficient energy reserve will remain to ensure a steep starting of the exposure. The input 871 of the excitation calculating unit 87 is connected to the output of the speed signal generator 81, its input 872 is connected to the tube current output 104, and its input 873 is connected to the tube voltage output 103.

Figure 19:
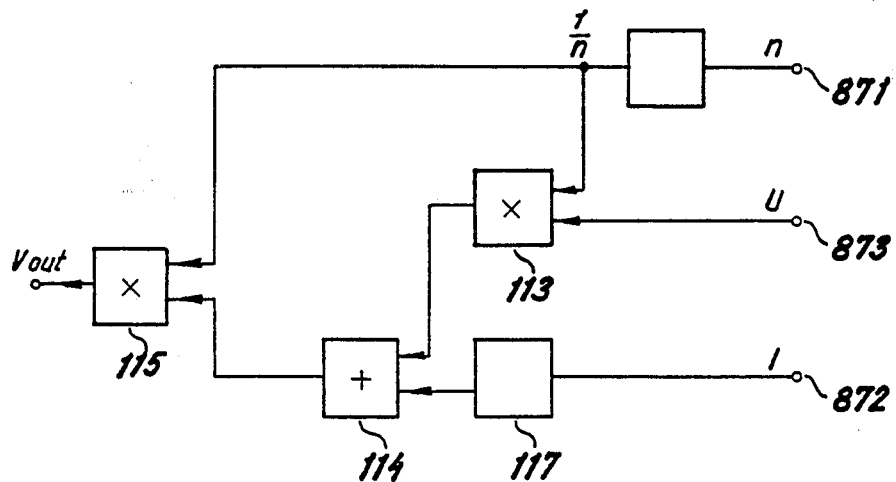
FIG. 19 is the block diagram of an embodiment of the excitation calculating unit shown in FIG. 17.

A preferred embodiment of the excitation calculating unit 87 is illustrated in FIG. 19, which comprises multiplier unit 113 and 115, an adder 114, a reciprocal value forming unit 116 and a coefficient forming unit 117.

The value of the calculated output voltage $V_{out}$ that adjusts the voltage of the controlled direct current voltage source is determined by the following relation:

$$V_{out} = k_1 \frac{\frac{U}{n} + k_2 I}{n}$$

Where U indicates the preset tube voltage, I indicates the preset tube current, n is the analog speed signal and $k_1$ and $k_2$ are coefficients. The above relation becomes clear after considering the fact that the numerator of the expression represents the energy demand of the generator 2B, where the member U/n indicates the dependence of the excitation on the speed and the member $k_2 I$ expresses the additional excitation demand of the armature reaction effect caused by the load. This quantity should be divided by the number of revolutions because the output voltage of the exciting machine 2A is also a linear function of the speed.

The operation of the equipment according to the invention will now be described beginning with the analysis of both the available and required energies.

Assume that the length of the flywheel 4 is 200 mm, its inner diameter is approximately 200 mm and the outer diameter is 280 mm. Under inner diameter, an average value is understood that is the mean value of the conical design. With such sizes the inertial torque of an aluminum flywheel 4 is about $\theta = 0.24$ kgm².

The values of energy stored in the flywheel 4 at different speeds are given in Table 1.

TABLE 1

| item | speed n (r.p.m.) | energy E (kJ) |
|---|---|---|
| 1 | 3000 | 12 |
| 2 | 4500 | 27 |
| 3 | 6000 | 48 |
| 4 | 7500 | 74 |
| 5 | 9000 | 108 |

Preferably each selected number of revolution given in Table 1 is in accordance with the speed allotted to each discrete output of the quantizing unit 82 shown in FIG. 17. Energy can be obtained from the flywheel 4 by switching on the generator unit 2, whereafter its speed continuously decreases. Table 1 can be used for determining the amount of energy that can be obtained from the flywheel 4 in case of given speed drops. If the flywheel 4 is slowed down from the 3rd, 4th and 5th discrete speeds relatively to the 2nd speed (which is equal to 4500 revolutions per minute), in sequence 21, 47 and 81 kJ energy (1 kJ = 1 kWsec) can be obtained, respectively. If the flywheel 4 is slowed down from a speed of 9000 to 3000 revolutions per minute, 108−12 = 96 kJ of energy will be released. It can be seen from Table 1 that the stored energy is proportional to the square of the speed and it is not worth decreasing the speed below the minimum 300 revolutions per minute because thereby no significant additional energy can be obtained, but the regulation gets more difficult.

After having summarized the available energies, now the power input demand will be described, connected with typical exposures required frequently in X-ray practice.

Table 2 shows the individual and total energy demands of certain exposure series.

TABLE 2

| Type of exposure | tube voltage (kV) | tube current .time (mAs) | energy (kJ) | number of exposures (N) | total energy demand (kJ) |
|---|---|---|---|---|---|
| heart - thorax | 81 | 4 | 0.33 | 20 | 6.6 |
| kidney - abdomen | 63 | 100 | 6.3 | 10 | 63 |
| skull | 70 | 80 | 5.6 | 5 | 28 |

The term "exposure-series" relates to a sequence of subsequent discrete exposures which are completed one after another. The intervals between subsequent exposures are so short that the electric motor cannot increase significantly the speed of the flywheel 4. Therefore the combined full energy for the exposure series is to be provided by the mechanical energy obtained by a single slow-down process.

Table 3 shows data for the main types of individual exposures that require the highest energy.

TABLE 3

| Type of exposure | tube voltage (kV) | tube current .time (mAs) | energy (kJ) |
|---|---|---|---|
| 5 lumbar vertebra profile | 85 | 200 | 17 |
| axial exposure of the bladder | 70 | 160 | 11.2 |
| pregnancy | 85 | 120 | 10.6 |

From the comparison of Tables 1–3, it can be seen that the chosen value of inertial torque is high enough to provide sufficient energy for carrying out all kinds of exposures mentioned above at speeds which can be realized easily in practice.

The time required for the motor to reach the operational speed is doubtless shorter than the time needed for adjusting the position of the patient between two exposure seres or for setting a new patient to the proper position. Thus the equipment takes in the energy required for the next exposure or for the next exposure-series during the "idle" time between the examinations.

Figure 20:
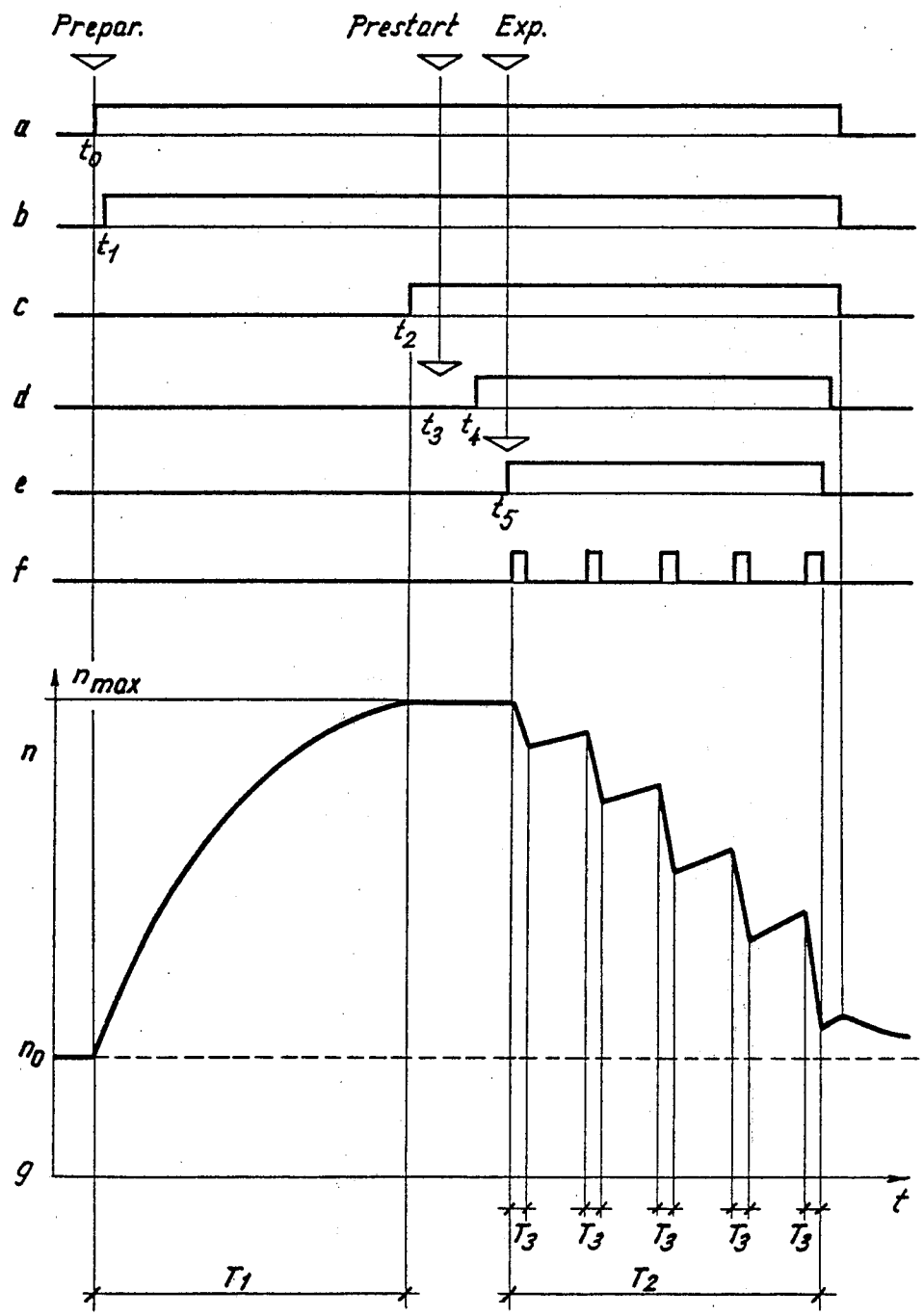
FIG. 20 shows various time-diagrams of the signals controlling the X-ray equipment.
Figure 21:
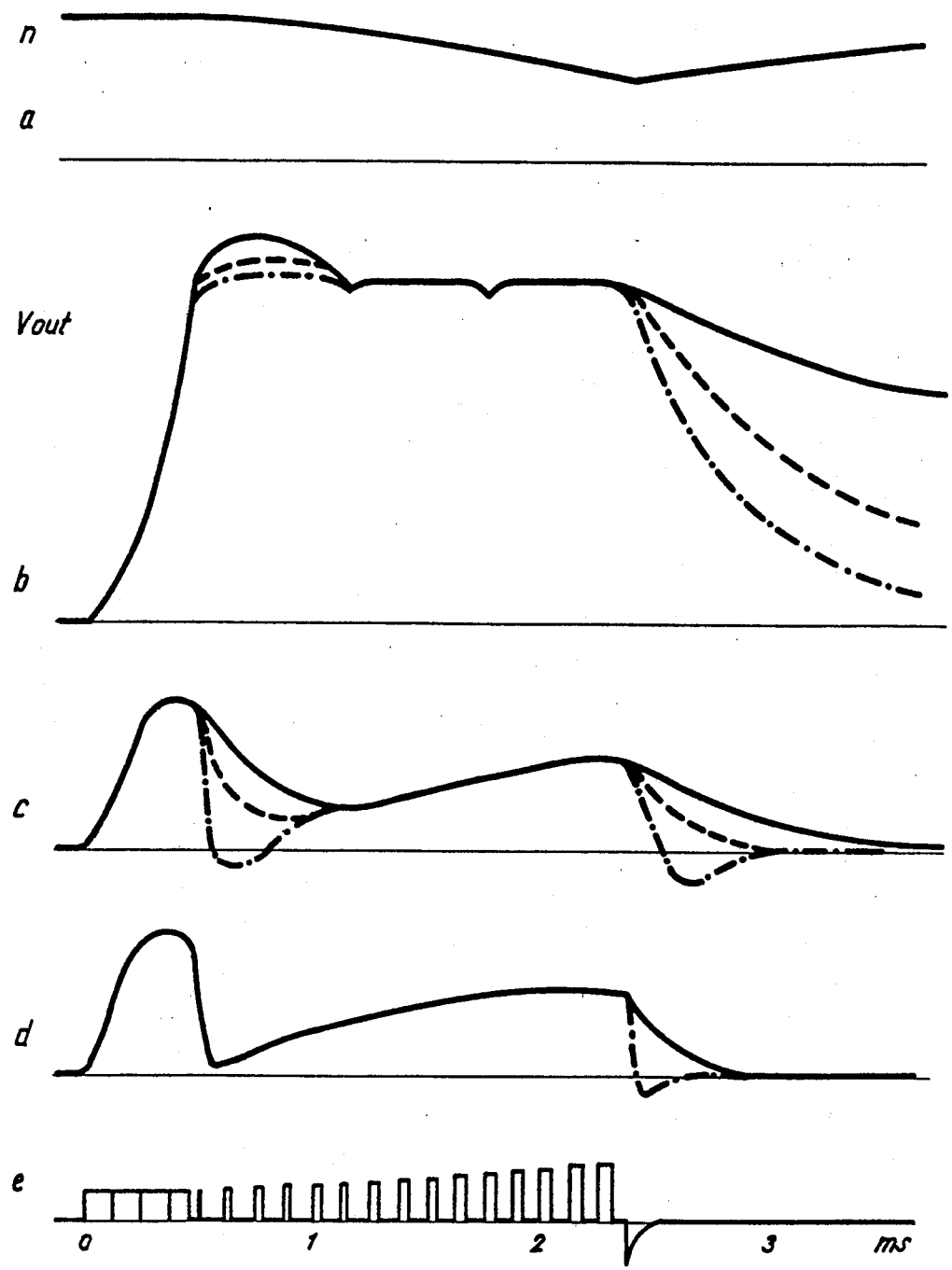
FIG. 21 illustrates the time-diagrams of signals being present in significant controlling points of the equipment during one short pulse.

The processes that take place during the individual exposures or exposure-series will be described in connection with FIGS. 20 and 21. The time scale of FIG. 20 is distorted, because for the sake of better understanding, the exposition is shown longer than required. FIG. 21 shows the mechanism of the regulation and the shape of the output signal during a single short exposition pulse, and compared to the scale applied in FIG. 20 its time scale is extended.

It is assumed that immediately before the time $t_o$ shown in FIG. 20, the energy calculating unit 83 has an output signal corresponding to a preset minimum speed $n_o$ and a reference signal corresponding to this speed $n_o$ of about 3000 r.p.m. which will appear at the output of the quantizing unit 83, which will be sent to the non-inverted input of the difference circuit 80 of the speed-regulating loop that controls the speed of the electric motor to reach the preset value of 3000 r.p.m. The operator sets the parameters of the exposure by the control unit 100 in accordance with the diagnostical requirements. When for example the exposure-series is chosen for a skull examination as shown in the last line of Table 2, the tube voltage should be set to 70 kV, the tube current to 800 mA, the time of exposition to 0.1 sec and the number of exposures in the series should be set to 5. After setting the required values the operator presses the preparation pushbutton at the time $t_o$, and as a result thereof the inputs of the energy calculating unit 83 will obtain in the form of analog signals the preset parameters of the exposure, and the unit 83 delivers an analog electric voltage signal at its output which controls the quantizing unit 83 and which is proportional to the full energy demand of 28 kJ of the exposure series (see Table 2). The discrete output signals of the quantizing unit 82 are selected in accordance with the discrete speed values given in Table 1, and for the energy demand of 28 kJ a reference signal corresponding to the speed of 7500 revolutions per minute will be sent from the output of the quantizing unit 82 to the non-inverted input of the difference circuit 80. The difference circuit 80 controls the speed regulating unit 79 by an analog signal that corresponds to the differnce between the instantaneous speed of 3000 revolutions per minute and the required speed of 7000 revolutions per minute, and the electric motor will be driven by an accelerating power. The speed of the flywheel 4 increases continuously from the time $t_o$, as shown in FIG. 20.

When the preparation pushbutton is pressed, the automatic tube protectiing device 86 is informed on the preset parameters of the tube, and on the basis of this information it determines that with the preset tube voltage and current, with the energy of 5.6 kJ and exposition time of 0.1 sec belonging to a single exposure and with the total energy of 28 kJ for the whole series of five exposures, the X-ray tube 93 will operate within its normal dissipation range and sends an enable signal to the tube protection input 109 of the control unit 100 at a time $t_1$ (see FIG. 20b)

At a time $t_2$ the speed of the electric motor reaches the preset value of 7500 revolutions per minute. In this case the value of the error signal will practically disappear at the output of the difference circuit 80, and the comparator unit 85 will send an enable signal to the speed input 107 of the control unit 100 (see FIG. 20c). The control unit 100 is preferably designed so that when the speed enable signal appears a lamp will be switched on indicating that the exposition can be started. The exposition can be started in two steps. In the first step a prestart signal is provided at time $t_3$ that enables the operation of the auxiliary circuits 94 through the prestart output 106b. The auxiliary circuits 94 will switch on the heating of the filament of the cathode and the running up of the anode, and when the X-ray tube 93 reaches a state suitable for exposition, at time $t_4$ an enable signal shown in FIG. 20d is transmitted to the auxiliary circuit input 108 of the control unit 100. Thereafter the operator can start the exposition.

the control unit 100 is advisably fitted with an automatic timing device, which following the occurrence of the speed enable signal waits for a while, e.g. for 30 seconds, to receive a prestart signal. If during this waiting time the prestart signal does not arrive, the control unit 100 changes the level of the input signal of the energy calculating unit 83, and as a result thereof the quantizing unit 82 will be set to the minimun speed setting, i.e. 3000 revolutions per minute. Such control eliminates the unnecessary running of the equipment. Similarly, after finishing a given program the control unit 100 rotates the electric motor at a minimum speed of, for example 3000 revolutions per minute for a certain time so that the next exposure can be started within a shorter period. That was the reason for the previous assumption that the electric motor is rotating with a speed of 3000 revolutions per minute before the prestart time $t_o$. It is obvious that if no prestart signal arrives within the preset time, e.g. within five minutes, the control unit 100 forbids the operation of the quantizing unit 82 across the enable input 821, and the electric motor without receiving any control voltage will stop operating.

From time $t_4$ onwards all the conditions required for starting the program of exposure are met, and the operator can start the program at time $t_5$ by pressing the start of the exposition button. At the first exposure a first pulse shown in FIG. 20f will appear at the exposition output 101 of the control unit 100. This pulse controls the enable input 92 of the pulse-width modulator 90, or in case of an alternative design it controls the reference signal generator 118. In response to this enable signal the controlled switch 91 starts operating and transmits the voltage of the controlled direct current voltage source 88 to the field terminals 15 and 16 of the generator unit 2 during the on-state of the controlling modulated pulse. Under the influence of the excitation an alternating voltage will be induced in the exciting machine 2A, which is rectified by the rectifier 18 and sent to the field magnet 6 of the generator 2B. A voltage is induced in the high-voltage coils of the armature 8 of the generator 2B and it is rectified by the high-voltage rectifier 2D. The so obtained high voltage will supply the X-ray tube 93.

As a result of the regulation the voltage and current parameters of the X-ray tube correspond to the values set by the control unit 100. When the preset exposure time of 0.1 sec. has elapsed, the control unit 100 finishes supplying the signal of exposition, and the generator unit 2 gets de-excited. It can be observed in FIG. 20g that during the exposition the speed of the flywheel decreases rapidly and between two expositions it increases to an insignificant extent, to the switched on driving of the electric motor.

The control unit 100 will generate all the exposition signals of the series in accordance with the program, and all of the five exposures are completed sequentially. As for the total energy demand of the series, the selected speed of 7500 revolutions per minute will provide sufficient energy therefor so that the five exposures can be completed without the need of accelerating the flywheel 4.

It should be noted that the duration of the running-up of section $T_1$, as indicated in FIG. 20, can vary between 1.5 to 2 minutes at the preset values, and with a driving motor of 600 W capacity the section $T_2$ can vary between about 1 to 10 sec.

During the sections $T_3$ of the exposition the field regulation circuits shown in FIG. 17 will provide the required parameters for the output signal. The essential time processes taking place during exposition are illustrated in FIGS. 21a–21e. Using the excitation calculating unit 87 and relying on the preset values of the exposure, the energy demand of the generator unit 2 can be calculated in advance assuming a specified, approximately 20% to 30% space factor (duty cycle) in the previously described way. Considering the fact that at the beginning of the exposition the possible steepest pulse running-up shape should be provided, at the beginning section of the exposition, the generator unit 2 will be overexcited by the differentiating elements in the regulating unit 89. FIG. 21e illustrates the signal shape of the pulses measured at the field terminals 15 and 16, FIG. 21d shows the current flowing in the field magnet 19 of the exciting machine. FIG. 21b shows the high-voltage pulse applied to the X-ray tube 93 (the output voltage of the checking signal generating unit 11 is proportional to this pulse) and FIG. 21a shows the speed of the flywheel 4. The time-scale in FIG. 21 is given in milliseconds, and the front and rear pulse edges correspond to the shortest values that can be realized.

The over-exciting during the initial section of the exposition can well be observed in FIGS. 21c, d and e. After this section the space factor (duty cycle) of the exciting width-modulated pulses will suddenly decrease, then it will gradually increase under the influence of the proportional and integrating elements of the regulating unit 89. In response to the decrease in speed the excitation calculating unit 87 increases the output voltage of the controlled direct current voltage source 88. Therefore the amplitudes of the width-modulated pulses will increase as indicated in FIG. 21e.

In FIG. 21 the diagrams drawn with dashed and dash-and-dot lines show the relations in case of using enforced de-exciting circuits. Before describing such circuits the application of the apparatus according to the invention for fluoroscopy mode of operation will be discussed.

According to an aspect of the invention it has been discovered that the sensed light intensity depends on the intensity of the transilluminating rays. Due to the persistence of the human eye, if the fluoroscopic rays are emitted in a pulse-like manner with relatively low space factor and with correspondingly increased intensity having such a high repetition frequency by which they are sensed without vibration, then the sensed light intensity will be inversely proportional to the space factor of the pulses at every given radiation energy.

Figure 22:
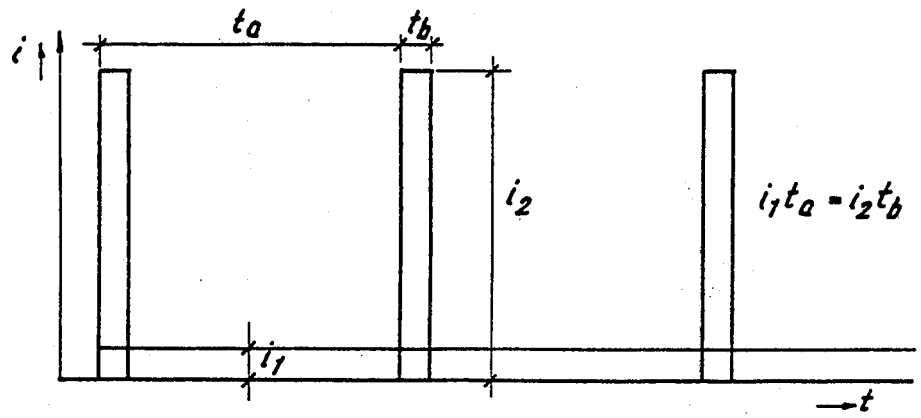
FIG. 22 is a time-diagram which illustrates the method according to the invention relating to X-ray fluoroscopy.

FIG. 22 shows such fluoroscopic pulses having a peak intensity of $i_2$ and an average intensity of $i_1$. One pulse and the concomitant interval have together a time period $t_a$, and the pulse itself had a duration $t_b$. The energy of the pulse train having pulses with peak intensity of $i_2$ and duration of $t_b$ will be given by the product of $i_2 \cdot t_b$, and this is equal to the energy of a continuous fluoroscopic X-ray radiation with a peak intensity of $i_1$ and a duration of $t_a$. The main difference lies in the fact that in case of the pulsed fluoroscopy mode the sensed light intensity will be higher, wherein the increase in sensed intensity corresponds to the ratio of $i_2/i_1$.

In conventional fluoroscopy mode, for example, the following continuous parameters can be set:

tube voltage = 100 kV, tube current = 3 mA, power input = 300 W.

If, for example, 25 pulses are taken per second, one pulse will last for 4 ms at a tube voltage of 100 kV and at a tube current of 30 mA and the average power consumption will be again 300 W. With such values a ten-fold increase in the sensation of the light intensity will be obtained. The apparatus according to the invention provides a possibility for the continuous generation of pulses with such energy and duration values. This statement can be verified by the fact that the energy of such a 4 ms long pulse is only 0.012 kJ, which is significantly lower than the energy values given for various speeds in Table 1. The main difference between the fluoroscopy and radiography modes of operation lies in the fact that in the former case between two subsequent exposures the electric motor can speed up the flywheel 4 to reach again the initial speed, while in the latter case the electric motor can only slightly increase the speed between the exposures in an exposure-series, as it has been explained before. This difference is caused by the fact that during fluoroscopy mode of operation—although the pulse power is 3 kW—the average power consumption is only 300 W, and this consumption can be covered by the power of the driving electric motor. In case of an exposure-series the total energy demand of each exposure in the series should be covered by the stored mechanical energy. In fluoroscopy mode of operation there can be a long-term continuous balance between the power demand and supply.

In case of the illustrated example the space factor of the pulses was 10. If a pulse length of 2 ms is chosen with a repetition frequency of 25 pulses per seconds, i.e. with a period time of 40 ms, the light intensity will increase twenty-fold, and in case of 1 ms long pulses it will increase fortyfold having a pulse power of 12 kW.

Considering the fact that in fluoroscopy mode of operation only a small amount of energy is obtained from the flywheel 4, it is sufficient for the power balance if the flywheel is operated with the lower speed. In this mode of operation the control unit 100 controls the higher priority input of the quantizing unit 82 through the line 102b and in response to such a control the quantizing unit 82 independent of the calculated energy generates a speed reference signal that corresponds to the lowest discrete speed. If during fluoroscopy a special-purpose radiography exposure is to be taken, then the quantizing unit 82 adjusts the speed according to the energy demand of this exposure.

FIG. 21 shows that the steepness of the front-edge of the exposure pulse can be increased to the required extent by appropriate over-excitation. The shortest running-up time obtained this way can be approximately 0.1 to 0.2 msec.

When the excitation has finished, the self-de-excitation occurs at a slower rate due to the remanence of the field magnets and the time constant of the winding, and in order to provide a definite short rear edge, the de-excitation process should be enforcedly accelerated. In case of the exciting machine this is an easier task. For accelerating the de-excitation of the exciting machine, e.g. an excitation of opposite polarity can be coupled to the field magnet 19 of the exciting machine through the field terminals 15 and 16, following the end of the exposure signal. This can be achieved by connecting a capacitor which is charged to an opposing polarity compared to the excitation, to the field magnet 19 of the exciting machine through an appropriate switching transistor. Such de-exciting pulse is represented by the last negative polarity spike in the pulse train shown in diagram e of FIG. 21.

Although there are several possibilities to realize the enforced de-excitation of the field magnet 6 of the generator 2B, some examples for the de-exciting circuits will be discussed in connection with FIGS. 23 and 24, which are preferable due to their simplicity.

In FIG. 23 the winding of the armature 17 of the exciting machine is shown with the rectifier 18 which rotates together with it. Between the field magnet 6 and the rectifier 18 there is a transistor 120, the base of which is connected to the common cathode of the diodes of the rectifier through a resistor 121. The field magnet 6 is connected in parallel with capacitor 122.

The transistor 12 is controlled in the forward direction by the output direct current voltage of the rectifier 18, therefore, during excitation the field magnet 6 is energized through the transistor 120 in a previously described manner. When at the end of the exposure signal the excitation is finished, the voltage of the armature 17 of the exciting machine will drop to zero and an induced voltage of opposite polarity will appear at the coil of the field magnet 6, and this voltage attempts to maintain the current at the expense of the stored magnetic energy. In this case, however, the forward control of the transistor 120 has already ceased, therefore the transistor 120 will break the circuit of the field magnet 6, resulting in a fast de-excitation. Considering that the circuit elements shown in FIG. 23, i.e. the armature 17 of the exciting machine, the rectifier 18 and the field magnet 6 are all built in and rotate together with the flywheel 4, the elements providing the fast de-excitation should also be affixed to the flywheel 4. The effect of the de-exciting circuit shown in FIG. 23 is illustrated in FIG. 21 by a curve drawn with a dashed line.

Figure 24:
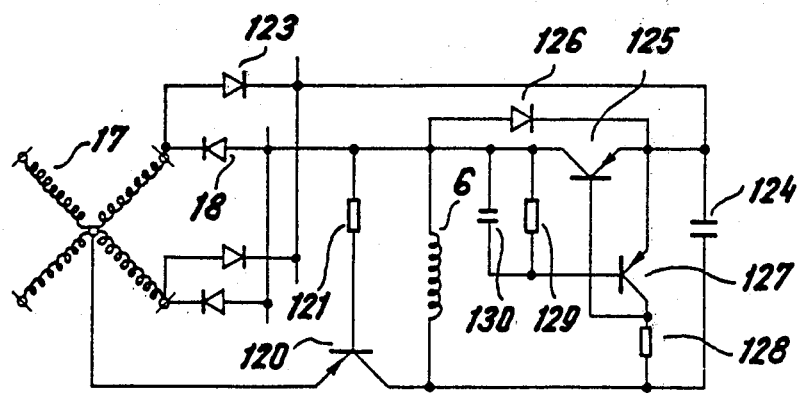
FIG. 24 is a circuit diagram of another fast de-energization circuit.

FIG. 24 shows an example of an active de-exciting circuit connection that also comprises the transistor 120 and the resistor 121 illustrated in FIG. 23, but here the field magnet 6 is connected to a circuit providing an excitation of reversed direction. Apart from the rectifier 18, the armature 17 of the exciting machine is connected additionally to a second rectifier 123, generating direct current voltage of opposite polarity, and this rectifier 123 is connected to one of the plates of an energy storing capacitor 124. Its other plate is connected to the end terminal of the field magnet 6, which is coupled to the collector of the transistor 120. Between the first plate of the energy storing capacitor 124 and the upper end terminal of the field magnet 6 there is a pass-through transistor 125 which is by-passed by a protecting diode 126. A controlling transistor 127 and its collector resistor 128 are connected between the plates of the energy-storing capacitor. The base of the transistor 125 is connected to the collector of a controlling transistor 127 and the base of the controlling transistor 127 is connected through a resistor 129 and a parallel capacitor 130 to the collector of the pass-through transistor 125.

The de-exciting circuit shown in FIG. 24 operates as follows: the rectifier 123 charges the energy-storing capacitor 124 with a voltage of such a polarity (in this case positive) that drives a current through a field magnet 6 which flows oppositely to the normal exciting current when the pass-through transistor 125 is open. When the armature 17 of the exciting machine generates voltage, the transistor 125 is kept in an off-state by the controlling transistor 127 being in a conducting state, and at the upper terminal of the field magnet 6 there is a negative voltage coming from the rectifier 18. When the excitation is finished the voltage of the armature 17 of the exciting machine returns to zero and the controlling transistor 127 is closed and the transistor 125 opens. The capacitor 130 accelerates the closing of the controlling transistor 127. From the positively charged energy-storing capacitor through the transistor 125 a current of opposite direction will flow to the field magnet 6, resulting in the fast de-excitation of the generator. Similarly to the circuit illustrated in FIG. 23 the elements of the circuit shown in FIG. 24 are built in and rotate with the flywheel 4. The curve drawn with dotted and dashed line in FIG. 21 illustrates the effect of the circuit shown in FIG. 24.

Considering the above explanation it is clear that by accelerated de-excitation the rear edge of the output pulse can be steeper, and the off-going time can be adjusted between about 0.2 to 0.5 msec. For the construction described hereinabove as an example of the apparatus according to the invention, the duration of the shortest pulse which can be generated is approximately 0.6 to 0.8 msec.

Obviously other constructions can also be used for the enforced de-excitation, than shown in FIG. 23 and 24. According to an alternative embodiment the exciting machine may have beside the armature 17 a separate de-exciting armature winding which can be connected to the field magnet 6 through a rectifier and a switching transistor having working principles similar to those of transistor 120 as indicated in FIG. 23. If a separate field magnet energized only for the duration of the de-excitation is associated with this separate winding of the exciting machine, the generated voltage will induce a current of opposite direction in the field magnet 6, resulting in the fast ending of the voltage.

In another alternative embodiment sections of a permanent magnet can be built in the pole core of the field magnet 6, or a ring of poles with permanent magnets can be arranged adjacent thereto, so the magnetic field of these poles can compensate the remanency of the pole core. As a result of this compensation the remaining magnetic field of the field magnet 6 cannot generate a voltage when excitation has finished.

Another possibility for the fast-killing of the remaining voltages is to provide short-circuited windings on the armature of the generator. The turns of this winding should be short-circuited by a separate control unit only for the duration of the complete de-energization. For this purpose switching circuits controlled by the rear edges of the exposure pulses can be applied.

In connection with the embodiments illustrated as shown in FIGS. 1 to 24 it can be understood that the apparatus according to the invention fulfills its basic task, i.e. it provides power supply for pulse-like loads with high power capacity, requires a low power source and as an additional feature renders possible the effecting of an advanced control for the X-ray equipment.

In conventional X-ray equipment, short exposure were set by biased magnetic multiphase switches constructed for the peak power of the X-ray equipment. Instead of using the conventional switching unit and the associated automatic control device, the control tasks of the X-ray equipment can be solved according to the invention at a power level which is three-four orders in magnitude less than the same at conventional controls, which is connected with lower costs and with smaller dimensions.

Each parameter of the output pulses can be set to specified values, wherefore the apparatus according to the invention can provide not only high pulse power, bit it can also ensure precisely specified voltage and current behavior during exposition.

As a result of the increase in the sensation of light intensity achieved by pulsed fluoroscopy, the optical darkening of the fluoroscopy room becomes an unnecessary requirement in case of normal radiation doses, or alternatively the traditional light intensity can be obtained with significantly smaller irradiation doses. The former advantage improves the working circumstances for radiologists and facilitates the picture evaluation, while the latter decreases the dose.

The apparatus according to the invention that can provide the exposure parameters described in the examples can be manufactured with a diameter of 0.3 m, having a height of 0.7 m and with a full weight of approximately 90 kp. The approximate dimensions and weight of the control unit associated therewith are: 0.2 m×0.3 m×0.4 m and 10 kp, respectively.

The high-voltage transformer unit of a traditional X-ray equipment with similar power capacity itself weighs approximately 400 kp, with dimensions of 0.5×0.7×1.2 m and the dimensions of the control system with the high power switches are 0.5×0.9×1 m, and their weight is 200 kp, furthermore a conventional control unit is also required for setting the desired exposure values.

For the purpose of comparison it should also be noted that for the operation of a traditional X-ray equipment a three-phase electric network of 100 kW power capacity is required with approximately 0.05 ohm loop resistance in all the three phases, while in case of the apparatus according to the invention which operates with the same power, only a one-phase electric network is required that can supply a power of 600–800 W and its network resistance can be as high as a few ohm The apparatus according to the invention is suitable for supplying not only X-ray apparatuses, but it can be used in all field applications where the load requires a pulse-like high power supply with a predetermined voltage. In such cases both the level and the time function of the output voltage can be kept at desired or preset values by means of the control circuits. The driving motor of the flywheel should provide only the average power consumption of the load. The apparatus according to the invention can be used for supplying loads operating with high pulse power like, e.g., pulse-laser equipment, microwave pulse-generators (radars), linear accelerators or betatrons, etc.

Within the field of radiology the apparatus according to the invention can be suitable for providing a simple, controlled, primary side supply for the high-voltage circuit of conventional X-ray equipment.

Of course, the invention cannot be limited to any of the exemplary embodiments described hereinabove, and it can be modified, corrected and improved in many ways without departing from the inventive concept.

What is claimed is:

1. An apparatus for supplying power for a high-power pulsatingly operated electric load comprising: a rotatably mounted shaft; a drive for rotating said shaft, said drive having substantially lower nominal power than operational power demand of a load; a flywheel coupled to and rotating with said shaft, said flywheel having a rotational energy corresponding to maximum energy demand of said load; a generator unit having field terminals and an output coupled to said load, said generator comprising an electric rotary machine, said rotary machine having a rotor connected to said shaft; a field power supply having an output connected to said field terminals of said generator unit and having a control input for determining the intensity of exciting current passed through said field terminals; and a control unit for adjusting operational parameters of said load, said control unit having unit output connected to said control input of said field power supply, said field power supply comprising a regulating input receiving a signal proportional to the electrical output of said generator unit to provide a field excitation for said rotary machine capable of maintaining said electrical output adjusted by said control unit.

2. An apparatus as defined in claim 1 wherein said generator unit comprises an exciting machine and a generator having rotors mechanically coupled, said exciting machine comprising a fixed field magnet coupled to said field terminals, an armature rotating together with said shaft, a first rectifier rotating together with said shaft and having an input coupled to said armature; said generator comprising a rotating field magnet connected to a direct current output of said first rectifier; a stator coupled to said load.

3. An apparatus as defined in claim 2 including a high voltage rectifier and a stator in said generator unit and comprising a high voltage winding connected to said load through said high voltage rectifier.

4. An apparatus as defined in claim 3 wherein said rectifier, said armature of said exciting machine and said field magnet of said generator are located inside said flywheel.

5. An apparatus as defined in claim 4 wherein said exciting machine and said generator comprise concentrically arranged stators and concentrically arranged rotors defining a plane air gap therebetween, each of said stators comprising a support disk, multiphase pole columns positioned in said support disk and extending therefrom normal to the plane of said air gap, a yoke for magnetically interconnecting said pole columns, armature coils and reference coils wound around said pole columns, said fixed field magnet of said exciting machine placed in a recess of said support disk facing towards said air gap and being arranged concentrically with said armature.

6. An apparatus as defined in claim 5 including a recess facing towards said air gap in said flywheel, a centering disk located in said recess, said rotating field magnet of said generator being arranged in the outer annular space of a centering disk opposite the end faces of said pole columns of said generator, said rotating field magnet comprising a multi-slotted pole core and field magnet coils wound around poles of said pole core; said armature of said exciting machine being located in the annular inner space of said centering disk concentrically with said rotating field magnet of said generator, and oppositely to said field magnet of said exciting machine, said armature of said exciting machine comprising a multipole slotted pole core and an armature coil wound around said poles.

7. An apparatus as defined in claim 6 wherein said pole core of said rotating field magnet of said generator, said pole core of said armature of said exciting machine, and said pole core of said field magnet of said exciting machine are formed from a block wound from transformer steel strip, said block having slots facing said airgap, and said pole cores having face planes extending to the plane of said airgap.

8. An apparatus as defined in claim 2 wherein said generator comprises a transformer having a primary coil connected to said armature of said generator and a secondary coil connected to said load.

9. An apparatus as defined in claim 8 wherein said flywheel comprises two faces and recesses on both said faces, said armature of said exciting machine being located in said first recess, said fixed field magnet of said exciting machine extending into said first recess, said rotating field magnet of said generator being located in the second recess and said armature of said generator extending into said second recess; said exciting machine and said generator comprising cylindrical air gaps, said first rectifier being located in said flywheel.

10. An apparatus as defined in claim 9 wherein said armature of said generator comprises a winding with conductors dimensioned for low voltage and high current.

11. An apparatus as defined in claim 10 including a hub ring, a stationary cover disk, a flywheel housing, said field magnet of said exciting machine being fixed on said hub ring and encircling said armature of said exciting machine, said hub ring being fastened to said stationary cover disk, an end of said flywheel housing being coupled to said cover disk, said flywheel housing having a cylindrical shape and an axis normal to the plane of said cover disk, the other end of said flywheel housing being coupled to said support disk; said flywheels, said rotors and said stators of said exciting machine and said generator being located inside said flywheel housing; a hub fastened to said support disk for mounting said stationary armature of said generator concentrically and inside said field magnet of said generator, said conductors forming the winding of said armature and having lead-out wires extending from inside said flywheel housing through said support disk.

12. An apparatus as defined in claim 11 including a stator comprising a multi-phase high-ratio transformer having columns normal to said support disk and being fastened thereto, said lead-out wires extending parallel to said columns, a primary winding of said transformer being conductor strips encircling said columns and being connected along a predetermined length to said lead-wires.

13. An apparatus as defined in claim 12 including: a two-phase high-ratio transformer having reference coils and high voltage secondary coils wound around said columns, said armature of said generator comprising a two-phase winding with winding parts displaced by 90 electrical degrees with respect to each other.

14. An apparatus as defined in claim 3 including a casing filled with insulating oil, said stator and said high-voltage rectifier being arranged inside said casing.

15. An apparatus as defined in claim 1 wherein said field power supply comprises: a first difference circuit having a first output connected to said regulating input and a second input connected to said control input; a coupling unit comprising proportional, integral and differential members and having an input connected to the output of said first difference circuit; a pulse-width modulator having an input coupled to the output of said regulating unit and adapted to produce a pulse sequence with a duty cycle depending on the voltage coupled thereto; a controlled switch having a control input coupled for determining the switching state to the output of said pulse-width modulator; and a direct-current power source having an output coupled through said controlled switch to said field terminals of said generator unit.

16. An apparatus as defined in claim 15 comprising a measuring unit for sensing speed of rotation of said shaft; said direct current power source being controlled with a control input for determining the output voltage thereof, said control input being coupled to an excitation calculating means at the output thereof and having a speed input coupled to the output of said measuring unit.

17. An apparatus as defined in claim 16 wherein said speed measuring unit comprises a tachometer disk mounted on said shaft, a light source and opto-electric sensing means arranged at opposite ends of said tachometer disk, and a speed signal generator controlled by the output pulses of said opto-electric sensing means and producing a speed signal.

18. An apparatus as defined in claim 16 comprising further: energy-calculating means being connected to a control unit at the output thereof determining the mode of operation and adapted to produce a speed reference signal proportional to the amount of energy to be obtained from said flywheel based on preset operational parameters; a speed measuring circuit; a second difference circuit having a non-inverted input coupled to the output of said energy calculating unit, and an inverted input connected to the output of said speed measuring circuit; and a speed control unit having an input connected to the output of said second difference circuit, said drive, rotating said shaft, having a speed determining control input connected to the output of said speed control unit.

19. An apparatus as defined in claim 18 including a quantizing unit coupled between the input of said energy calculating unit and a non-inverted input of said second difference circuit.

20. An apparatus as claimed in claim 18 for supplying and controlling said load defined by an X-ray device, comprising: an automatic tube protecting unit coupled to said control unit; auxiliary circuits required for operating an X-ray tube, having an input and output connected to a respective output and input of said control unit, said generator comprising a high-voltage winding for providing high voltage for operating said X-ray tube; said high-voltage rectifier coupled to said high voltage winding; said control unit comprising an exposure output coupled to an enabling input of said field power supply; a mode-of-operation output producing a signal depending on the preset mode of operation for the control input of said energy calculating means for said automatic tube protecting unit; a tube voltage output producing a signal proportional to the preset tube voltage and coupled to the tube voltage inputs of said excitation calculating means, of said energy calculating means and of said automatic tube protecting unit and to the reference input of said first difference circuit; a tube current output producing a signal proportional to the preset tube current and coupled to the tube current inputs of said excitation calculating means of said energy calculating means and of said automatic tube protecting unit; an exposure time output producing a signal proportional to the preset time of exposure and coupled to the exposure time inputs of said energy calculating means and of said automatic tube protecting unit; and a comparator having an input connected to the output of said second difference circuit and producing a speed enable signal at the output of said comparator when the sensed speed of said shaft substantially approaches the preset speed, the output of said comparator being coupled to a speed input of said control unit.

21. An apparatus as defined in claim 20, wherein said excitation calculating means comprises a reciprocal value forming unit having an input connected to said speed input, a first multiplier having a first input coupled to the output of said reciprocal value forming unit and a second input connected to a voltage input; a coefficient forming unit having an input coupled to a current input; an adder having a first input connected to the output of said first multiplier and a second input connected to the output of said coefficient forming unit; and a second multiplier having a first input connected to the output of said reciprocal value forming unit and a second input connected to the output of said adder.

22. An apparatus as defined in claim 4 including a switching circuit between said first rectifier and said rotating field magnet arranged to rotate with said shaft for accelerating the de-excitation process.

23. An apparatus as defined in claim 22 wherein said switching circuit comprises a transistor having a collector-emitter path connected in series with a first end of said rotating field magnet and a base coupled to a second end of said rotating field magnet.

24. An apparatus as defined in claim 22 including a counter-energizing circuit coupled to that rotating field magnet of said generator arranged to rotate together with said shaft; said counter-energizing circuit generates an inverse voltage coupled to the field winding to accelerate de-energization thereof when the output signal should be set suddenly to zero.

25. An apparatus as defined in claim 24 wherein said counter-energizing circuit comprises a second rectifier for producing a direct-current voltage having a polarity opposed to the voltage of said first rectifier; an energy storage capacitor charged by said second rectifier, a pass-through transistor coupled between said energy storage capacitor and said rotating field magnet; a control transistor for opening said pass-through transistor when direct voltage has ceased.

* * * * *